(12) United States Patent
Tilton et al.

(10) Patent No.: US 11,250,369 B2
(45) Date of Patent: Feb. 15, 2022

(54) COMPUTERIZED SYSTEM FOR DETECTING THE EXPOSURE AND IMPACT OF AN ENTITY WITHIN VIRTUAL NETWORKING PLATFORMS

(71) Applicant: Sponsorhouse, Inc., San Diego, CA (US)

(72) Inventors: Scott Tilton, Cardiff, CA (US); Robert J. Kraus, Encinitas, CA (US); Michael Robinson, Del Mar, CA (US)

(73) Assignee: SPONSORHOUSE, INC., San Diego, CA (US)

( * ) Notice: Subject to any disclaimer, the term of this patent is extended or adjusted under 35 U.S.C. 154(b) by 96 days.

(21) Appl. No.: 16/582,948

(22) Filed: Sep. 25, 2019

(65) Prior Publication Data

US 2020/0019912 A1 Jan. 16, 2020

Related U.S. Application Data

(63) Continuation-in-part of application No. 14/702,839, filed on May 4, 2015, now abandoned.
(Continued)

(51) Int. Cl.
*G06Q 10/06* (2012.01)
*H04L 29/08* (2006.01)

(52) U.S. Cl.
CPC ....... *G06Q 10/06393* (2013.01); *H04L 67/20* (2013.01); *H04L 67/22* (2013.01)

(58) Field of Classification Search
CPC .......... G06Q 30/02; G06Q 10/063114; G06Q 10/0633; G06Q 10/06393;
(Continued)

(56) References Cited

U.S. PATENT DOCUMENTS

| 8,681,630 B1 * | 3/2014 | Gibson | G06F 9/54 370/235 |
| 9,002,920 B2 | 4/2015 | Deryugin et al. | H04M 3/5175 |

(Continued)

FOREIGN PATENT DOCUMENTS

| WO | WO 2014/153222 | 9/2014 | G06F 17/30 |
| WO | WO 2014/183089 | 11/2014 | G06F 19/00 |

OTHER PUBLICATIONS

Beres, A. (2012). Sentiment analysis framework organization based on twitter corpus data. Scientific Bulletin of the "Petru Maior" University of Targu Mures, 9(1), 22-25. (Year: 2012).*
CL. Knott, & MSt. James. (2004). An alternate approach to developing a total celebrity endorser rating model using the analytic hierarchy process. International Transactions in Operational Research, 11(1), 87-95. (Year: 2004).*
(Continued)

*Primary Examiner* — William S Brockington, III
(74) *Attorney, Agent, or Firm* — Hayes Soloway P.C.

(57) ABSTRACT

A system for analyzing and quantifying an impact of an entity's presence within a virtual networking environment to provide an impact scorecard of the entity to a $3^{rd}$ party is provided. A server has an API data feed to at least one virtual networking platform. A plurality of factors are extracted from the feed with a plurality of calculators, including a commitment score calculator, a performance score calculator, and a reach score calculator. At least one display dashboard is accessible on the server from a computing device of the $3^{rd}$ party. The at least one display dashboard visually displays a marketability assessment of the entity on the virtual networking platform based on the factors from the data feed.

20 Claims, 28 Drawing Sheets

Related U.S. Application Data

(60) Provisional application No. 62/106,810, filed on Jan. 23, 2015.

(58) Field of Classification Search
CPC ......... G06Q 10/06398; G06Q 30/0241; G06Q 30/0282; G06Q 30/0208; G06Q 30/0236; G06Q 30/0242; G06Q 30/0275; G06Q 30/0277; G06Q 30/0283; G06Q 10/10; G06Q 10/00; G06Q 10/06316; G06Q 10/1093; G06Q 40/125; G06Q 50/01
See application file for complete search history.

(56) References Cited

U.S. PATENT DOCUMENTS

| | | | |
|---|---|---|---|
| 9,020,965 B1 | 4/2015 | Sehrer | G06F 17/30 |
| 9,405,597 B1* | 8/2016 | Luff | G06F 21/44 |
| 9,875,440 B1 | 1/2018 | Commons | G06N 3/08 |
| 2002/0198766 A1 | 12/2002 | Magrino | G06Q 10/06 |
| 2006/0042483 A1 | 3/2006 | Work | G06Q 10/00 |
| 2009/0319436 A1 | 12/2009 | Andra | G06F 17/2785 |
| 2010/0121857 A1 | 5/2010 | Elmore et al. | G06F 17/30 |
| 2011/0173214 A1 | 7/2011 | Karim | G06F 17/30 |
| 2013/0073389 A1 | 3/2013 | Heath | G06F 15/16 |
| 2013/0110567 A1 | 5/2013 | Omar | G06Q 10/06 |
| 2013/0218310 A1 | 8/2013 | Johnson | G06F 17/60 |
| 2014/0156372 A1 | 6/2014 | Postrel | G06Q 30/0226 |
| 2014/0280209 A1 | 9/2014 | Kivirauma et al. | G06F 17/3089 |
| 2014/0289057 A1* | 9/2014 | Kowal | G06Q 30/0277 705/14.73 |
| 2014/0349750 A1 | 11/2014 | Thompson et al. | A63F 13/12 |
| 2015/0120717 A1 | 4/2015 | Kim et al. | G06F 17/3053 |
| 2015/0120721 A1 | 4/2015 | Kim et al. | G06F 17/30 |
| 2015/0363688 A1 | 12/2015 | Gao et al. | G06N 3/04 |
| 2016/0019599 A1* | 1/2016 | Puntoriero | G06Q 30/08 705/7.35 |
| 2016/0048754 A1 | 2/2016 | Wang et al. | G06F 3/04 |
| 2016/0213994 A1 | 7/2016 | Tilton et al. | A63B 71/00 |
| 2017/0068982 A1 | 3/2017 | Vangala et al. | G06Q 30/0224 |
| 2017/0277691 A1* | 9/2017 | Agarwal | H04W 4/21 |
| 2018/0240147 A1 | 8/2018 | Stevens et al. | G06Q 30/0244 |

OTHER PUBLICATIONS

Pikas, B., Schied, R., & Pikas, A. (2012). Assessing the qualities of athlete endorsers: A study of consumer preferences for the 3 qualities of sports endorsers attractiveness, trustworthiness, expertise. Journal of Marketing Development and Competitiveness, 6(3), 42-55. (Year: 2012).*

International Search Report and Written Opinion issued in application No. PCT/US20/039000, dated Aug. 28, 2020 (15 pgs).

International Preliminary Report on Patentability issued in application No. PCT/US19/026813. dated Oct. 13, 2020 (8 pgs).

U.S. Appl. No. 14/702,839, filed May 4, 2015.

U.S. Appl. No. 16/380,724, filed Apr. 10, 2019.

International Search Report and Written Opinion issued in application No. PCT/US19/26813, dated Aug. 7, 2019 (12 pgs).

Knott et al., "An alternate approach to developing a total celebrity endorser rating model using the analytic hierarchy process." International Transactions in Operational Research, vol. 11, No. 1, Jan. 2004, pp. 87-95 (Year: 2004) (9 pgs).

Office Action issued in U.S. Appl. No. 14/702,839, dated Apr. 20, 2018 (15 pgs).

Office Action issued in U.S. Appl. No. 14/702,839, dated Aug. 28, 2018 (13 pgs).

Office Action issued in U.S. Appl. No. 14/702,839, dated Aug. 25, 2017 (7 pgs).

Office Action issued in U.S. Appl. No. 14/702,839, dated Dec. 26, 2017 (10 pgs).

Office Action issued in U.S. Appl. No. 14/702,839, dated Mar. 25, 2019 (13 pgs).

Pikas et al., "Assessing the Qualities of Athlete Endorsers: A Study of Consumer Preference for the 3 Qualities of Sports Endorsers." Journal of Marketing Development and Competitiveness, vol. 6, No. 3, Aug. 2012, pp. 42-55 (Year: 2012) (15 pgs).

International Search Report and Written Opinion issued in application No. PCT/US19/065737, dated Feb. 25, 2020 (11 pgs).

Office Action issued in U.S. Appl. No. 16/710,971, dated Sep. 14, 2021, 33 pgs.

U.S. Appl. No. 16/380,724, filed Apr. 10, 2019, Tilton et al.

U.S. Appl. No. 16/710,971, filed Dec. 11, 2019, Kraus et al.

International Preliminary Report on Patentability issued in application No. PCT/US19/065737, dated Jun. 16, 2021 (8 pgs).

* cited by examiner

FIG. 2H

COMPUTERIZED SYSTEM FOR DETECTING THE EXPOSURE AND IMPACT OF AN ENTITY WITHIN VIRTUAL NETWORKING PLATFORMS

CROSS-REFERENCE TO RELATED APPLICATIONS

This application is a continuation-in-part application, and claims the benefit of U.S. application Ser. No. 14/702,839, entitled, "Athlete Scoring and Ranking Systems" filed, May 4, 2015, which itself claims the benefit of U.S. Provisional Application No. 62/106,810, filed on Jan. 23, 2015, which are herein incorporated by reference in their entirety.

FIELD OF THE DISCLOSURE

The following description relates to the measurement and assessment of virtual networking data, and in more particular, to computerized systems and methods for detecting the exposure and impact of an entity within one or more virtual networking platforms.

BACKGROUND OF THE DISCLOSURE

Brands or companies often provide discounted or free merchandise to athletes for promoting their brand or company. Many factors may determine which athlete or group of athletes a brand or company will choose for promoting their products. At least one aspect used to make this determination is the general value and marketability of an athlete. Additionally, athletes are competitive, not only with respect to their sports, but also with respect to popularity, fame, and value.

The value and marketability of an athlete is typically used by athletes, fans, critics, media, and companies to determine their impact within a sport. Typically, a measurement of the familiarity and appeal of an athlete, brand, company, celebrity, or television show that is used is a Q Score. The higher the Q Score, the more highly regarded the person is among the group that is familiar with them. Q Scores and other variants are primarily used by the media, marketing, advertising, and public relations industries.

Q Score respondents are typically given the following choices for each person or item being surveyed: one of my favorites; very good; good; fair, poor; and never heard of. The score is calculated by dividing the percentage of respondents who answer "one of my favorites" by the total percentage of respondents who are familiar with the subject matter multiplied by 100. Accordingly, a level of the marketability of an athlete is typically determined by surveying a number of individuals within a group.

In the modern age of social networks and electronic media, the Q Score or impact an athlete or other entity has may often depend on how prevalent they are in the virtual world. Whether through media content, virtual networking connections, or other interaction, it may be possible to measure electronic data relevant to the athlete which can then be compiled and processed to output a value of the athlete within the virtual world. This measurement however, is often difficult to obtain, due to different data formats, the difficulty of parsing through the voluminous amount of data online, authentication and verification of data, and the constraints the virtual networking platforms put on data feeds.

Thus, a heretofore unaddressed need exists in the industry to address the aforementioned deficiencies and inadequacies.

SUMMARY OF THE DISCLOSURE

This Summary is provided to introduce a selection of concepts in a simplified form that are further described below in the Detailed Description. This Summary is not intended to identify key features or essential features of the invention, nor is it intended to be used as an aid in determining the scope of the claims.

Embodiments of the present disclosure provide a system for analyzing and quantifying an impact of an entity's presence within a virtual networking environment. Briefly described, in architecture, one embodiment of the system, among others, can be implemented as follows. At least one virtual networking platform has at least one account associated with the entity. An application programming interface (API) provides a data feed from the at least one virtual networking platform. A server has a processor in communication with the API to receive the data feed from the at least one virtual networking platform and extract a plurality of factors at least partially from the data feed. The plurality of factors quantified with a plurality of calculators include: a commitment score calculator extracting commitment factors at least partially from the data feed to derive a commitment score based on a weighted sum of the commitment factors, wherein the commitment factors include a time period of activity of the entity on the at least one virtual networking platform; a performance score calculator extracting performance factors at least partially from the data feed to derive a performance score based on a weighted sum of the performance factors, wherein the performance factors include a numerical value indicative of success within a field of activity of the entity; a reach score calculator extracting reach factors at least partially from the data feed to derive a reach score based on a weighted sum of the reach factors a portion of the plurality of reach factors received from the data feed. The reach factors comprise at least one of: a total audience of the entity on the virtual networking platform; an audience growth of the entity on the virtual networking platform over a predetermined period of time; a total travel coverage of the entity over a predetermined period of time; a number of interactions of the entity on the virtual networking platform; and a level of activity of interactions between the entity on the virtual networking platform and other entities on the virtual networking platform. At least one display dashboard is accessible on the server from a computing device of the $3^{rd}$ party, the at least one display dashboard visually displaying a marketability assessment of the entity on the virtual networking platform, wherein the marketability assessment is based on a weighted sum of at least one of the commitment score, the performance score, and the reach score, and wherein the display dashboard visually displays the marketability assessment in proximity to at least one ranking of entities selected from the group consisting of: entity performance, brand promotion, and social media performance.

The present disclosure can also be viewed as providing a system for analyzing and quantifying an impact of an entity's presence within a virtual networking environment to provide a marketability assessment of the entity to a $3^{rd}$ party. Briefly described, in architecture, one embodiment of the system, among others, can be implemented as follows. At least one social media platform has at least one account associated with the entity. An application programming interface (API) provides a data feed from the at least one social media platform. A server has a processor in communication with the API to receive the data feed from the at least one social media platform and extract a plurality of factors at least partially from the data feed. The plurality of factors are quantified with a plurality of calculators comprising: an entity score calculator extracting entity score factors at least partially from the data feed to derive the entity's impact using a ratio of at least one of a commitment score, a performance score, and a reach score, wherein the reach score is determined from reach factors extracted at least partially from the at least one social media platform, and wherein the reach factors comprise at least one of: a total audience of the entity on the social media platform; an audience growth of the entity on the social media platform over a predetermined period of time; a total travel coverage of the entity over a predetermined period of time; a number of interactions of the entity on the social media platform; and a level of activity of interactions between the entity on the social media platform and other entities on the social media platform; a hierarchy calculator extracting hierarchy factors at least partially from the entity score to derive a hierarchy level of the entity, wherein the entity score calculator adjusts the entity score using the hierarchy level calculated by the hierarchy calculator. At least one display dashboard is accessible on the server from a computing device of the $3^{rd}$ party, the at least one display dashboard visually displaying a marketability assessment of the entity on the social media platform, wherein the marketability assessment is based on the entity score, and wherein the display dashboard visually displays the marketability assessment in proximity to at least one ranking of entities selected from the group consisting of: entity performance, brand promotion, and social media performance.

The present disclosure can also be viewed as providing a system for analyzing and quantifying an impact of an entity's presence within a virtual networking environment to provide an impact scorecard of the entity to a $3^{rd}$ party. Briefly described, in architecture, one embodiment of the system, among others, can be implemented as follows. At least one virtual networking platform has at least one account associated with the entity. An application programming interface (API) provides a data feed from the at least one virtual networking platform. A server has a processor in communication with the API to receive the data feed from the at least one virtual networking platform and extract a plurality of factors at least partially from the data feed. The plurality of factors are quantified with a plurality of calculators comprising: a commitment score calculator extracting commitment factors at least partially from the data feed to derive a commitment score based on a weighted sum of the commitment factors, wherein the commitment factors include a time period of activity of the entity on the at least one virtual networking platform; a performance score calculator extracting performance factors at least partially from the data feed to derive a performance score based on a weighted sum of the performance factors, wherein the performance factors include a numerical value indicative of success within a field of activity of the entity; and a reach score calculator extracting reach factors at least partially from the data feed to derive a reach score based on a weighted sum of the reach factors a portion of the plurality of reach factors received from the data feed. A virtual networking platform sync module has an authentication system, a token management system, an account sync system, and a post sync system, wherein at least one of the commitment scores, the performance score, and the reach score are updated after a period of time using the virtual networking platform sync module. At least one display dashboard is accessible on the server from a computing device of the $3^{rd}$ party. The at least one display dashboard visually displays a total impact scorecard for the entity on the virtual networking platform, wherein the display dashboard visually displays the marketability assessment.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

The foregoing summary, as well as the following detailed description, will be better understood when read in conjunction with the appended drawings. For the purpose of illustration, certain examples of the present description are shown in the drawings. It should be understood, however, that the invention is not limited to the precise arrangements and instrumentalities shown. The accompanying drawings, which are incorporated in and constitute a part of this specification, illustrate an implementation of system, apparatuses, and methods consistent with the present description and, together with the description, serve to explain advantages and principles consistent with the invention.

FIGS. 2B-2H are diagrams illustrating computer architecture and processing of the virtual networking entity detection unit of the system, in accordance with the first exemplary embodiment of the present disclosure.

Figure 1:
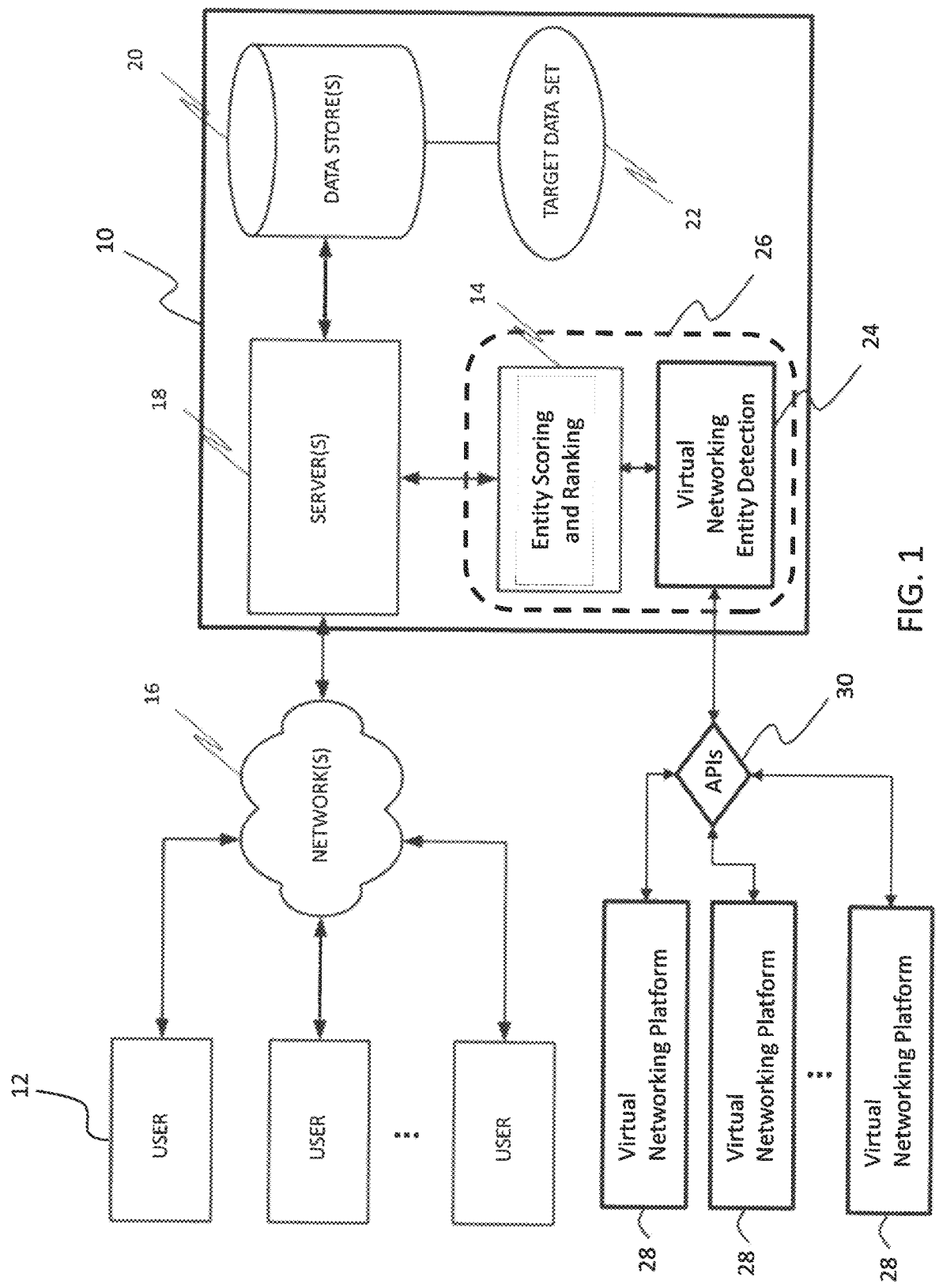
FIG. 1 is a diagram illustrating a system for analyzing and quantifying an impact of an entity's presence within a virtual networking environment, in accordance with a first exemplary embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

FIG. 1 is a diagram illustrating a system 10 for analyzing and quantifying an impact of an entity's presence within a virtual networking environment, in accordance with a first exemplary embodiment of the present disclosure. As shown, FIG. 1 depicts the system 10 within an environment where users 12 can interact with the system 10 through a network 16. The users 12, as shown in FIG. 1, may be computerized user accounts corresponding to one or more human, corporate, or other entity, which uses a computing device, such as a smart phone, tablet computer, or the like, to interact with the system 10. The network 16 may include any type of computerized or electronic network, such as the Internet, a cloud network, a LAN, or other wired or wireless network.

The system 10 may generally include an entity impact unit 26 which includes various modules for performing various functions. Together, the modules or units forming the entity impact unit 26 may comprise programmable software for performing functions by a processor. As shown, in general terms, the entity impact unit 26 may include an entity scoring and ranking unit 14 and a virtual networking entity detection unit 24. These units may be used in conjunction to measure, assess, analyze, and/or quantify the impact of an entity's presence within one or more virtual networks. While the system 10 may be used with a variety of different entities in different settings, for clarity in disclosure, the subject application is described relative measuring, assessing, analyzing, and quantifying the impact of an athlete within a social networking platform. In this example, the system 10 may use the entity scoring and ranking system 14 and the virtual networking entity detection unit 24 to analyze one or more athlete's presence, participation, and reach within one or more virtual networking platforms, which can be used to produce scores and/or rankings for evaluating a value, influence, or marketability of the one or more athletes. In other settings, the system 10 may be used with other entities to achieve other functions.

Continuing with the example using athletes, it is noted that the users 12 may include one or more athletes, fans, companies, among other users interested in analyzing the value or influence of the one or more athletes. These users 12 can interact with the system 10 through a number of ways, such as over one or more networks 16, which are connected with servers 18 within the system 10. The servers 18 can host the entity impact unit 26 and the various units or modules thereof. One or more data stores 20 can store the data to be analyzed by the system 10 as well as any intermediate or final data generated by the system 10.

The entity impact unit 26 of the system 10 may be in communication with one or more virtual networking platforms 28, which may be computerized social media platforms, such as Facebook®, Twitter®, Instagram®, YouTube®, or any other social media or content distribution platform. The entity impact unit 26 of the system 10 may be in communication with these virtual networking platforms 28 using an application programming interface (API) 30, which is an interface or communication protocol between client and server computing devices, which allows for the communication and transmission of data between the client and server computing device. It is further noted that the system 10 can be an integrated web-based tool that provides users flexibility and functionality for performing the various tasks of the system 10, such that users can access the system 10 through an Internet connection and visually interface with a user interface of the system 10 through their computing device. However, depending on the design of the system 10, it could also be provided on a stand-alone computer for access by a single user, or by predetermined users or blocks of users (such as those that are registered or have appropriate permission to access the system 10).

Figure 2A:
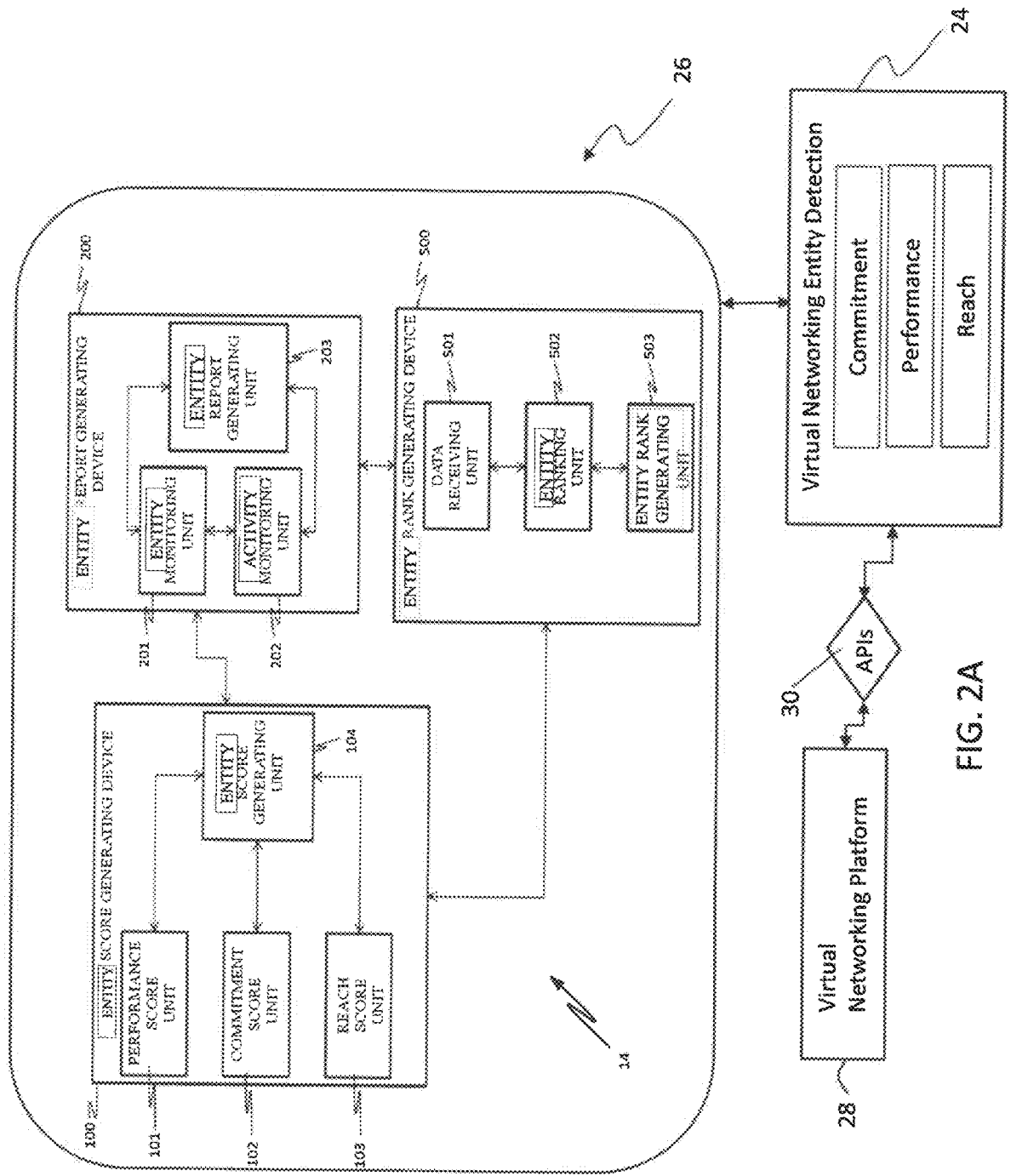
FIG. 2A is a diagram illustrating an example of an athlete scoring and ranking system, in accordance with the first exemplary embodiment of the present disclosure.

FIG. 2A is a diagram illustrating a computer architecture and processing example of the entity impact unit 26 of the system 10. Referring to FIG. 2A, an entity impact unit 26 of the system 10 illustrates the entity scoring and ranking unit 14 and virtual networking entity detection unit 26 of FIG. 1 in greater detail, in particular, with the entity scoring and ranking unit 14 broken into an entity score generating device 100, an entity report generating device 200, and an entity rank generating device 500. An entity score generating device 100 includes a performance score unit 101, a commitment score unit 102, a reach score unit 103, and an entity score generating unit 104. An entity report generating device 200 includes an entity monitoring unit 201, an activity monitoring unit 202, and an entity report generating unit 203. An entity rank generating device 500 may include a data receiving unit 501, an entity ranking unit 502, and an entity rank generating unit 503. The entity score generating device 500, the entity report generating device 200, and the entity rank generating device 500 receive information from the virtual networking entity detection unit 24 to score and rank the various entities within the virtual networking platforms 28. A more detailed description of the entity score generating device 100, the entity report generating device 200, and the entity rank generating device 500 can be found in reference to FIGS. 8 and 21.

As noted herein, the virtual networking entity detection unit 24 collects or detects the relevant information from the virtual networking platform 28, and elsewhere, and provides this data to the entity scoring and ranking unit 14. In general terms, the virtual networking entity detection unit 24 is a computerized module which communicates with the virtual networking platform and uses various technological features and advancements to detect available data on the virtual networking platforms 28, to analyze available data, and to parse the data to determine which data is relevant to the entity scoring and ranking unit 14. Different types of data may be derived from different sources accessible by the virtual networking entity detection unit 24. As shown in FIG. 2A, the virtual networking entity detection unit 24 may generally detect data which is identifiable into one of three different categories: commitment, performance, and reach. The relevant data for each of these categories, and how that data is derived, detected, achieved, and processed is explained relative to FIGS. 2B-2H.

FIGS. 2B-2H are diagrams illustrating computer architecture and processing of the virtual networking entity detection unit 24 of the system 10, in accordance with the first exemplary embodiment of the present disclosure. With reference to FIGS. 1-2H, the different categories of the virtual networking entity detection unit 24—commitment, performance, and reach—may be understood to describe different data attributes of an entity, all or a portion of which may be used by the entity scoring and ranking unit 14. For example, commitment attributes may be based on a time period of participation of an entity, a time period of a specific activity (such as competition activity), the total time period participating in a given period of time, such as within the past 30 days or 12 months, and a total travel coverage within a period of time. This information may be derived from both user input, results reported from $3^{rd}$ parties, such as athletic organizers, and from analysis of originating source data related to an entity. Performance attributes, for example, may be derived from performance metrics over a period of time. For an athlete, it may be a performance score over a previous 12 months, where events are categorized and the performance is quantified based on the category and event. Reach attributes may be used to describe the entity's influence or popularity within a virtual networking platform within a confined group, a confined geographic region, and/or all over the world. The reach attributes, for example, may be based on a total audience of the entity, the audience growth over a period of time, interactions of the entity over a period of time, travel coverage over a period of time, and/or performance scores over a period of time. These attributes may be derived through novel processing and data collection from the virtual network platforms 28.

While commitment attributes may include data which is input or uploaded to the system 10 directly from users, from $3^{rd}$ parties, or from other sources, the system 10 may also include $3^{rd}$ party application integrations to verify and/or collect data. For example, commitment attributes may include the entity's participation in events over a period of time, the data of which may be reported from "sessions" data, e.g., data reported from $3^{rd}$ parties about the results of participation with particular events or sessions that takes place at a specific location. However, input of this data may be unreliable or inaccurate, depending on the format of the data, the architecture of the $3^{rd}$ party's application, and other variables. To ensure that input data is accurate, the entity may operate all or a portion of the virtual networking entity detection unit 24 on their mobile computing device, and the user may record sessions using the virtual networking entity detection unit 24 along with geolocation data derived from a locating device within the user's computing device. This may include, for example, a GPS chip, or other locating device, such as one operating through WiFi, NFC, BlueTooth, or others. The virtual networking entity detection unit 24 may utilize the geolocation data detected via the mobile computing device and a native app SDK. Using the GPS location provided by the mobile computing device, when a session is started, the location is used to look up the corresponding location data of the mobile computing device. This location data is then correlated with a feature or setting of the session. For example, for an athlete, the location data may be correlated with the location of known sporting venues, e.g., such as by cross-correlating the location data with that stored in the data stores 20.

In order to correlate the location data successfully, a geolocation proximity algorithm may then be used to match the geolocation with a data stores 20 or other stored location, which allows the virtual networking entity detection unit 24 to verify a session's accuracy when a location is successfully matched. If a location cannot be correlated or matched to a location in the system 10, the session is marked as unverified. An unverified session may be subjected to further verification or may be omitted from the commitment analysis. An example of the geolocation proximity algorithm is provided herein:

```
Code to calculate Latitude of Session
Input to SQL Query: @Radius
RETURN: (@Radius / 3959) * 180 / PI( )
Code to calculate Longitude of Session
Input to SQL Query: @Radius, @Latitude
RETURN: (asin(sin(@Radius / 3959)/cos(@Lat * PI( ) / 180))) * 180 / PI( )
Get Sessions
If we have Latitude & Longitude, then to get public sessions we also join in table "SPOTS"
INNER JOIN (SELECT Spot_ID FROM Spots WHERE Spots.Lat >= (@CenterLat –
dbo.CalculateLatDegrees(@Radius)) AND Spots.Lat <= (@CenterLat +
dbo.CalculateLatDegrees(@Radius)) AND Spots.Lon >= (@CenterLon –
dbo.CalculateLonDegrees(@Radius, @CenterLat)) AND Spots.Lon <= (@CenterLon +
dbo.CalculateLonDegrees(@Radius, @CenterLat))) NearbySpots ON NearbySpots.Spot_ID =
GroupSessions.Spot_ID"
WHEN Sorting by distance to get Public Sessions:
SQL FUNCTION "GET DISTANCE"
Input to SQL Query: Lat1, Lng1, Lat2, Lng2
IF @Lat1 = @Lat2 AND @Lon1 = @Lon2
    RETURN 0 /* same lat/long points, 0 distance = */
DECLARE @x decimal(18,13)
SET @x = 0,0
/* convert from degrees to radians */
SET @Lat1 = @Lat1 * PI( ) / 180
SET @Lon1 = @Lon1 * PI( ) / 180
SET @Lat2 = @Lat2 * PI( ) / 180
SET @Lon2 = @Lon2* PI( ) / 180
/* distance formula – accurate to within 30 feet */
SET @x = Sin(@Lat1) * Sin(@Lat2) + Cos(@Lat1) * Cos(@Lat2) * Cos(@Lon2 – @Lon1)
IF 1 = @x
    RETURN 0 /* same lat/long points – not enough precision in SQL Server to detect earlier */
DECLARE @EarthRadius decimal(5,1)
SET @EarthRadius = 3963.1
RETURN @EarthRadius * (–1 * Atan@x / Sqrt(1 – @x * @x)) + PI( ) / 2)
```

Figure 2B:
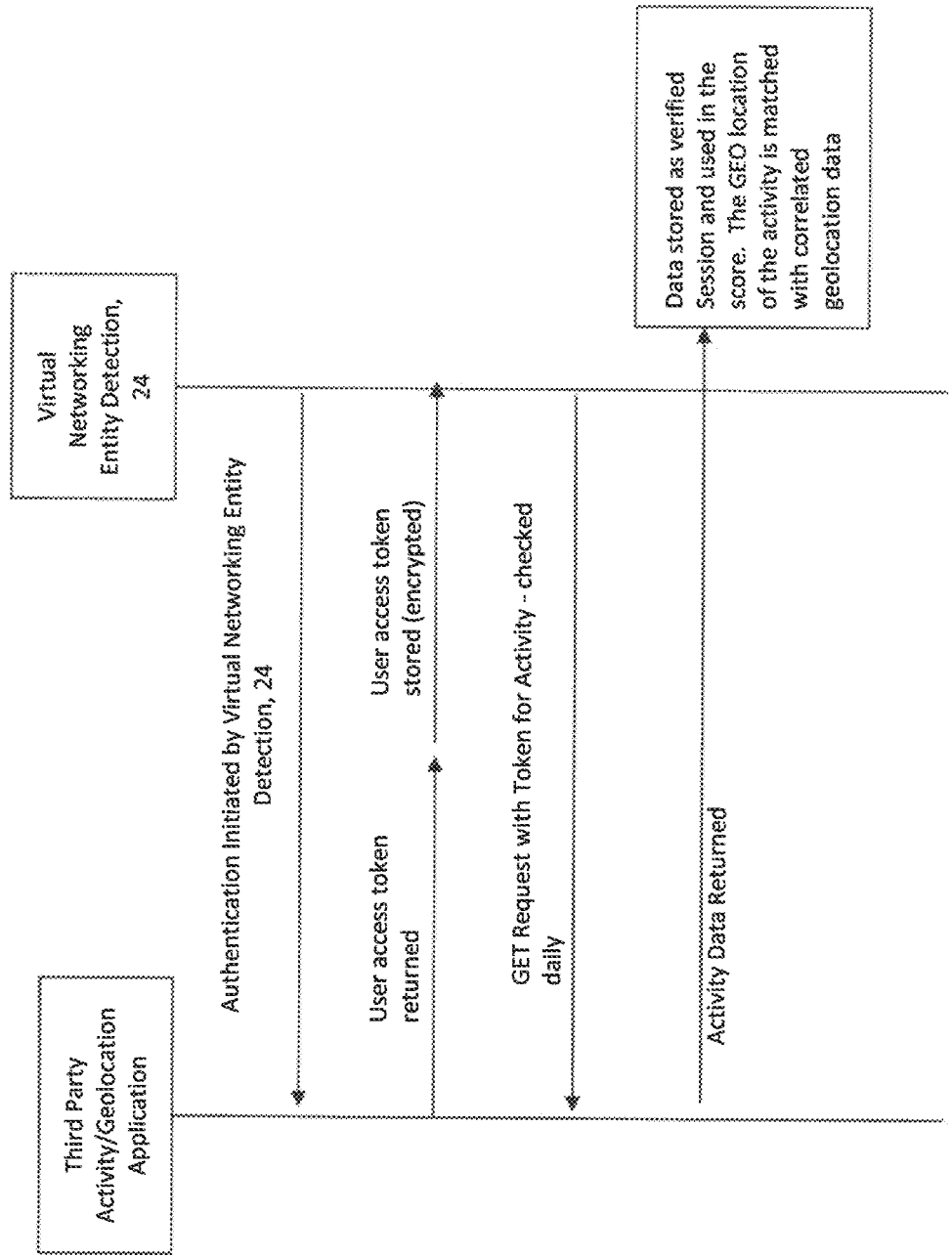

Furthermore, if the entity does not use a local version of the virtual networking entity detection unit 24 on their mobile computing device, the system 10 may allow for geolocation data to be input to the virtual networking entity detection unit 24 using third party integrations. For example, a user may run a third party application, such as Strava, to collect the geolocation data, which is then transferred to the virtual networking entity detection unit 24 and authenticated. FIG. 2B is a diagram of third party integration of geolocation data. As shown, the entity can collect the geolocation and other data through an activity application. In the example of FIG. 2B, athletes can use a Strava application to post each time they run, ride, swim, or surf, etc. If they want those sessions to count towards the commitment calculations of the virtual networking entity detection unit 24, they can connect or authenticate their Strava account with the system 10. In doing so, the virtual networking entity detection unit 24 automatically pulls their sessions into the database and will verify the locations, dates and times of each session. This input of the data includes initiating an authentication by the virtual networking entity detection unit 24. A user access token may be returned from the third party application, which is stored in an encrypted format in the virtual networking entity detection unit 24. Then a request for input of data with the token for activity is run periodically, such as once a day. Activity data (session data) is returned to the virtual networking entity detection unit 24. Once input into the virtual networking entity detection unit 24, the activity data may be verified against the corresponding geolocation data of the activity, such that geolocation correlation can be performed.

The algorithmic processing used by the system 10 for these tasks may be as follows:

```
Strava Integration Code:
Strava Integration Endpoint =
String.Format("https://www.strava.com/api/v3/athlete/activities?access_token=" +
ConnectedNetwork.AccessToken
Public Shared Sub ProcessActivityFile(fileName As String, member_id As Guid)
    Dim activities As JArray = JsonConvert.DeserializeObiect(Of JArray)(fileName)
    Dim isVerified As Boolean = True
    'load up all the strava sessions for this user
    Dim sessions As SessionCollection = New SessionCollection(String.Format("select * from sessions
where Member_ID = '{0}' and Source = {1}", member_id.ToString, 12))
    Dim mainSportID As Guid = CType(DataLibrary.Database.ExecuteScalar("Select top 1 Sport_ID
FROM mapMember2Sports WHERE member_id = '" & member_id.ToString & "' order by Preference"),
Guid)
        If activities IsNot Nothing Then
            For Each activity As JObject In activities
                'if we already have this then ignore it
                If sessions.BySource_ID(activity("id").ToString) IsNot Nothing Then
                    'double check the verified flag
                    If sessions.BySource_ID(activity("id").ToString).Verified = False Then
                        If isEmpty(activity("start_latitude")) = False And isEmpty(activity("start_longitude")) =
False Then
                            Log.Warn(String.Format("Activity_ID {0} forMember_id {1} should be verified and it
```

```
isn't", activity("id").ToSting, member_id.ToString))
            Dim session As Session = sessions.BySource_ID(activity("id").ToString)
            session.Verified = True
            session.SaveData( )
          End If
        End If
      Else
        Dim startDate As Date = activity("start_date").ToObject(Of Date).ToLocalTime
        Dim endDate As Date = startDate.AddSeconds(activity("elapsed_time"),ToObject(Of
Integer))
        ''VirtualRide can't be verified but we want to log their activity
        If activity("type").ToString.ToUpper = "VIRTUALRIDE" Then
          isVerified = False
        End If
        'look up the sport_id
          'if TRIATHLON is their main sport and activity type = swim, run, bike then use
TRIATHLON as the sport
        Dim sportID As Guid
        If String.Compare(mainSportID.ToString, "4623BE8B-D8DF-41A2-B86D-
5B3DE589A6BD", True) = 0 And
            (String.Compare(activity("type").ToString, "RUN", True) = 0 Or
            String.Compare(activity("type").ToString, "SWIM", True) = 0 Or
            String.Compare(activity("type").ToString, "RIDE", True) = 0) Then
          sportID = mainSportID
        Else
          sportID = GetSportId(member_id, activity("type").ToString)
        End If
        If sportID = Nothing Then
          Continue For
        End If
        Dim spotID As Guid
        If isEmpty(activity("start_latitude")) = True Or isEmpty(activity("start_longitude")) = True
Then
          'need to have a spot!
          spotID = emptySpotID
          isVerified = False
        Else
          spotID = GetSpotId(sportID, Convert.ToDouble(activity("start latitude")),
Convert.ToDouble(activity("start_longitude")), activity, is Verified)
        End If
        If spotID <>Nothing Then
          'check to see if we have already mapped this spot to this sport
          Dim m As mapSpots2SportsAndDiscipline = New
mapSpots2SportsAndDiscipline("SELECT * From mapSpots2SportsAndDisciplines WHERE Spot_ID= '"
& spotID.ToString & "' AND Sport_ID = '" & sportID.ToString & "'")
            If m.Exists = False Then
              m.Spot_ID = spotID
              m.Sport_ID = sportID
              m.SaveData( )
            End If
            'now add a Session - verified
            Dim sessionID As Guid = Guid.NewGuid
            Dim session As Session = New Session
            session.Session_ID = sessionID
            session.Sport_ID = sportID
            session.Member_ID = member_id
            session.StartDate = startDate
            session.EndDate = endDate
            session.Spot_ID = spotID
            session.Source = Source.Strava
            session.Verified = isVerified
            session.CreatedDate = startDate
            session.Source_ID = activity("id").ToString
            Log.Debug(String.Format("Saving Session activityType = {0}, Session_id = {1}, Spot_id
= {2}", activity("type"), sessionID.ToString, spotID))
            session.SaveData( )
            'now add a segment SessionSegments
            Dim sSegment As SessionSegment = New SessionSegment
            sSegment.Session_ID = sessionID
            sSegment.StartTime = startDate
            sSegment.EndTime = endDate
            sSegment.MaxSpeed = activity("max_speed").ToObject(Of Double)
            sSegment.AverageSpeed = activity("average_speed").ToObject(Of Double)
            sSegment.Distance = ConvertKilometersToMiles(activity("distance").ToObject(Of
Double))
            sSegment.SaveData( )
            'add a Group Session -with name
            Dim gsID As Guid = Guid.NewGuid( )
            Dim gs As GroupSession = New GroupSession
```

```
                gs.GroupSession_ID = gsID
                gs.Sport_ID = sportID
                gs.Spot_ID = spotID
                gs.StartDate = startDate
                gs.CreatedBy = member_id
                gs.SaveData( )
                'add a GroupSessionParticipants
                Dim gsParticipants As GroupSessionParticipant = New GroupSessionParticipant
                gsParticipants.GroupSession_ID = gsID
                gsParticipants.ParticipationStatus = GroupSessionParticipationStatus.Accepted
                gsParticipants.Session_ID = sessionID
                gsParticipants.InvitedBy = member_id
                gsParticipants.HookitMember_ID = member_id
                gsParticipants.SaveData( )
            End If
        End If
    Next
  End If
End Sub
Private Shared Function GetSpotID(sportID As Guid, lat As Double, lon As Double, activity As
JObject, isVerified As Boolean) As Guid
  Dim rad As Double = 0.25
  Dim spots As New ResultSet(Of Spot)
  spots = DataLayer.Spots.GetSpots(, , False, , lat, lon, rad, 1, 2, True, , 0, False, , 0, 50)
  If spots.Results.Count > 0 Then
      Log.Debug("spot found For {0}at lat {1}lon {2}", spots.Results(0).UniqueName,
activity("start_latitude"), activity("start_longitude"))
      Return spots.Results(0).Spot_ID
  Else
      Try
          Dim loc As String = GetLocatiomName(activity("location_city").ToString,
String.Format("{0},{1}", activity("start_latitude"), activity("start_longitude")))
          "Needs to intergate with ShortLatLonLookup table
          'Dim 1 As JObject = Common.GetLocation( String.Format("{0},{1}", activity("start_latitude"),
activity("start_longitude")))
          If loc <>"" Then
              Dim Name As String = loc
              Dim City As String = loc.
              If loc.Length > 250 Then Name = Name.Substring(0, 249)
              If loc.Length > 100 Then Name = Name.Substring(0, 99)
              'add a spot
              Dim spot As Spot = New Spot
              spot.Spot_ID = Guid,NewGuid( )
              spot.Name = Name
              spot.City = City
              spot.State = activity("location_state").ToString
              spot.Country = activity("location_country").ToString
              spot.Lat = activity("start_latitude").ToObject(Of Double)
              spot.Lon = activity("start_longitude").ToObject(Of Double)
              spot.Verified = isVerified
              spot.SaveData( )
              Return spot.Spot_ID
          Else
              Return Nothing
          End If
      Catch ex As Exception
          Return Nothing
      End Try
  End If
End Function
Private Shared Function GetSportId(member_Id As Guid, sportName As String) As Guid
  Dim strSql As String = String.Format("Select top 1 Sport_ID "&
                "from ("&
                "Select distinct ms.Preference, s.name, m.member_id, m.DisplayName,
s.Sport_ID, ss.SportName " &
                "  from Members m inner join mapMember2Sports ms on m.Member_ID =
ms.Member_ID " &
                "       inner join sports s on ms.Sport_ID = s.Sport_ID" &
                "       inner join mapSourceSport2Sport ss on s.Sport_ID = ss.Sport_ID " &
                "where 1=1 " &
                " And m.member_id = '{0}' " &
                " And ss.SportName = '{1}' " &
                "order by Preference ", member_Id.ToString, sportName)
  Dim sport_ID As Guid = CType(Database.ExecuteScalar(strSql, , GetType(DataObjects.Member),
False), Guid)
  If sport_ID = Nothing Then
      Log.Debug(String.Format("Can't map this activity {0} to this member {1}sports ", sportName,
member_Id.ToString))
      Return Nothing
```

```
    Else
        Return sport_ID
    End If
End Function
```

With regards to performance attributes of the virtual networking entity detection unit 24, an event & result system may be used to calculate a performance score. In the example using athletes, performance is based on users' results at an athletic competition event, where points may be awarded for each competition based on the reach (local, regional, national, international) of the event, level (amateur, semi-pro, pro) of the event, type (exhibition, pre-season, regular season, playoffs, championship, etc.) of the event, the level of the class (beginner/novice, amateur, expert, semi-pro, pro) competed in at the event, the competing users and the result in the competition of the user being scored— including but not limited to place (win/loss or 1st, 2nd, 3rd), time (for timed sports) or on field performance (catches, tackles, rushing yards, etc.).

Competition results used in the performance score may be derived from third party integrations, such as Sportradar, directly from the event promoters/organizers, internally by the virtual networking entity detection unit 24, or provided by the users. When results are derived from third party sources, event promoters, or results managed internally may be automatically verified by the virtual networking entity detection unit 24. Here, the athlete competitor and result are verified as well as the corresponding location data. If a result is provided by the user or cannot be verified, it may be marked as unverified and does not contribute towards the performance score at full value. The use of the verified location data, as discussed relative to FIG. 2B may be additionally used as an input to the travel coverage, which contributes points to the commitment and reach units. For new users, competition results that are imported may be archived until the user has the ability to claim verified results to improve their performance.

The virtual networking entity detection unit 24 may use the following components to derive performance: event & class taxonomy; result import workflow; result format normalization; user matching & result claiming, and/or result points calculation.

Event and class taxonomy & categorization may be a major factor in the value of a result. Event categorization is often determined by experts within the system 10, but may also be determined by the 3rd party source (e.g. Sportradar), the promoter themselves or programmatically based on the overall values of the competitors within the system 10. Within competitions, many sports also have various classifications that could be based on age, gender, skill level, distance, equipment type or any combination. For example, a mountain bike race may have a "Women Sport Age 25-29" class and a "Women Expert Age 25-29" class, where the only difference is the skill level (sport v. expert). These two classes are categorized as different skill levels and thus should be worth different values for the same end result, since a win in the Sport class is worth less than a win in the Expert class. The difficulty is that every sport has different class structure and additionally every promoter has their own variation to the data being published or reported, which makes it very difficult to normalize classes. To overcome this limitation, the system 10 uses a database having a list of roughly 200,000 competition classes categorized in 127 different sports, from motocross to water polo to fencing. Each sport also has a classification system to identify skill level based on specific keywords. For example, in mountain biking, the term 'sport' is synonymous with the 'amateur skill level' whereas in motocross, the term 'intermediate' or just the letter 'B' denote amateur classes. The system processes these terms based on their relative correlation to the particular sport in order to correctly and accurately identify the specific value of the data. This process of normalization also allows for expansion of the class database with a manual, e.g., human, auditing capabilities.

Figure 2C:
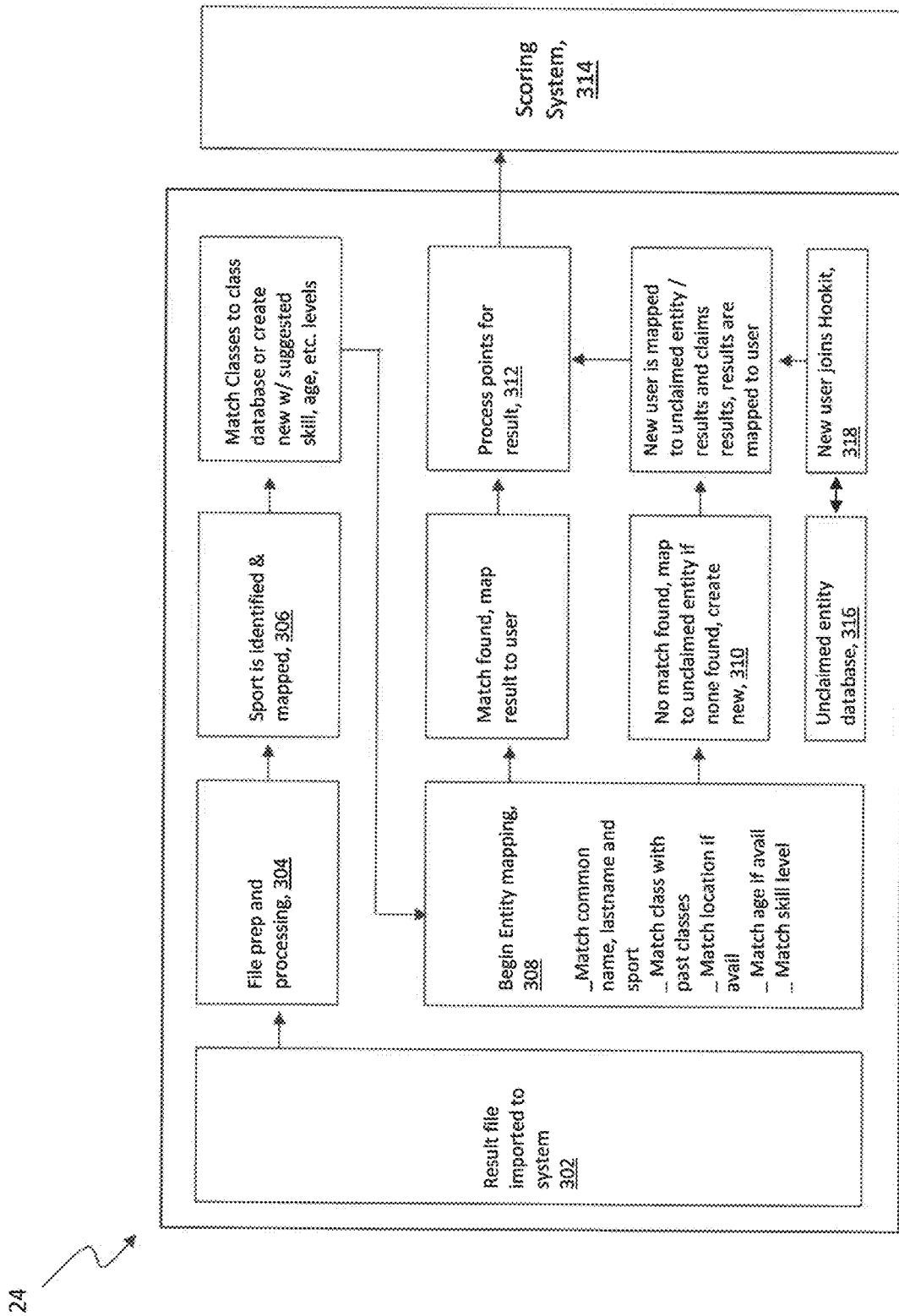

With regards to the result import workflow, a specific process may be followed to ensure accurate performance data is received. FIG. 2C is a diagram illustration of the result import workflow of the virtual networking entity detection unit 24, in accordance with the first exemplary embodiment of the present disclosure. As shown by block 302, a result file is imported into the system 10. The file is prepared for processing at block 304, which may include normalizing column headers, data & matches to data model. Then, sport and classes are mapped and categorized at block 306, which is done based on class names if sport not present in the received data file. Next, entities are identified & mapped at block 308, which includes matching common names, last names and sports, matching classes with past classes, matching location, if available, matching age, if available, and matching skill level. If user cannot be identified, an attempt is made to identify unclaimed entity and map it, and if the unclaimed entity cannot be identified, new unclaimed entity is created (block 310). The eventual results, whether through entity matches or new creations, are processed for point allocation (block 312). The results points are input to performance score in entity scoring system of the virtual networking entity detection unit 24 (block 314). At any time, if a new user joins the system 10, they may be mapped to an unclaimed entity (based on name, location, age, class), the results mapped to that entity may be claimed by the user and the points calculated & allocated to that user, as shown at blocks 316 and 318.

With regards to result format normalization, each data source for results may have different data included with the file and may name the data differently, so the system 10 may normalize this data in order to be flexible regardless of the type or format of the data that was imported. Within this normalization process, one of the most important and any additional useful fields are normalized by taking into account sport specific vernacular, misspellings and combined fields. For example, the system 10 recognizes that various terms or nomenclature are related, and it processes this information to convert the various data points received into a uniform data set. For example, the system 10 recognizes that the terms 'class' and 'group' are synonymous and that city, state may be in separate fields or comma separated in the same field.

In order to automate the process of result management, it may be important that the users listed in the results are either matched to a user in the system 10 or in the case that a match cannot be made, the results are aggregated and archived by user still for future matching and/or claiming by the user.

Accordingly, the virtual networking entity detection unit 24 may match users and claim results, to ensure that correct corresponding data is input into the system 10. To achieve this, algorithmic processing may be used, an example of which is provided herein:

```
...
    'Multiple matches, so we'll loop through and try to remove members that don't
appear to be a proper match
        'using various methods to narrow it down
        'See if we can find 1 member that is an event participant
        MatchedMembers = New DataLibrary.DataObjectCollectionBase(Of
DataObjects.EmptyContainer)
        For Each Member As DataObjects.EmptyContainer In Members
            If CType(Member("ParticipationStatus"),
DataObjects.EventParticipationStatus) > DataObjects.EventParticipationStatus.NotSet Then
                MatchedMembers.Add(Member)
            End If
        Next
        If MatchedMembers.Count = 1 Then Members = MatchedMembers
        'Check to see if this got this down to 1 member
        If Members.Count = 1 Then
            Result.Member_ID = Members(0)("Member_ID")
        Else
            Dim ThisClass As New DataObjects.Class
            ThisClass.GetObject(Result.Class_ID)
            'See if this class is a pro level event and, if so, see if any of these members are
at a pro level
            If ThisClass.ExperienceLevel = DataObjects.ExperienceLevel.Pro Then
                MatchedMembers = New DataLibrary.DataObjectCollectionBase(Of
DataObjects.EmptyContainer)
                For Each Member As DataObjects.EmptyContainer In Members
                    If CType(Member("CareerLevel"), DataObjects.CareerLevel) =
DataObjects.CareerLevel.Pro Then MatchedMembers.Add(Member)
                Next
                If MatchedMembers.Count > 0 Then Members = MatchedMembers 'If we
could get 1 or more members this way, keep them otherwise we will just work with the original set
            End If
            If Members.Count = 1 Then
                Result.Member_ID = Members(0)("Member_ID")
            Else
                'See if we can find 1 member who's main sport matches this classes' sport
                MatchedMembers = New DataLibrary.DataObjectCollectionBase(Of
DataObjects.EmptyContainer)
                For Each Member As DataObjects.EmptyContainer In Members
                    If DataLibrary.Database.ExecuteScalar("SELECT COUNT(*) FROM
mapMember2Sports WHERE Member_ID = '" & Member("Member_ID").ToString & "' AND
Preference = 0 AND Sport_ID = '" & ThisClass.Sport_ID.ToString & "'", ,
GetType(DataObjects.Member)) > 0 Then
                        MatchedMembers.Add(Member)
                    End If
.. continues...
```

Next, with regards to result points calculation, for every result that is imported to the system 10, points are assigned that are later used for the calculation of the performance score. An example of the code used for this points calculation is provided herein:

```
CREATE PROCEDURE [dbo].[CalculateIndexPoints]
AS
BEGIN
    SET NOCOUNT ON;
    Create Table #IndexPoints(
        Result_ID UNIQUEIDENTIFIER NOT NULL PRIMARY KEY,
        ActualPoints FLOAT NOT NULL
    )
    INSERT INTO #IndexPoints (Result_ID, ActualPoints)
    SELECT Result_ID, (Maxpoints * p.percentage) ActualPoints
    FROM (
        SELECT *,
        (CASE RankingLevel
            WHEN 2 THEN
                CASE ExperienceLevel
                    WHEN 0 THEN 25
                    WHEN 1 THEN 25
                    WHEN 2 THEN 50
                    WHEN 3 THEN 75
                    ELSE 125
                END
            WHEN 3 THEN
                CASE ExperienceLevel
                    WHEN 0 THEN 50
                    WHEN 1 THEN 50
                    WHEN 2 THEN 75
                    WHEN 3 THEN 125
                    ELSE 250
                END
            WHEN 4 THEN
                CASE ExperienceLevel
                    WHEN 0 THEN 75
                    WHEN 1 THEN 75
                    WHEN 2 THEN 125
                    WHEN 3 THEN 250
                    ELSE 500
                END
            WHEN 5 THEN
                CASE ExperienceLevel
                    WHEN 0 THEN 75
```

```
        WHEN 1 THEN 75
        WHEN 2 THEN 125
        WHEN 3 THEN 250
        ELSE 500
        END
    ELSE -- 1
        CASE ExperienceLevel
        WHEN 0 THEN 15
        WHEN 1 THEN 15
        WHEN 2 THEN 25
        WHEN 3 THEN 50
        ELSE 75
        END
    END) * (CASE WHEN Verified = 1
    THEN 1 ELSE .5 END) MaxPoints
    FROM (
        SELECT
            Result_ID, Place, CASE WHEN
            ISNULL(RankingLevel, 0) = 0 THEN
1 ELSE RankingLevel END RankingLevel,
        CASE WHEN ISNULL(Events.ExperienceLevel, 0) = 0 THEN 1
        -- If Class skill is less than event skill (unless it's not set), override
        ELSE
            CASE WHEN ISNULL
            (Classes.ExperienceLevel, 0) = 0 THEN
                Events.ExperienceLevel
            ELSE
                CASE WHEN Classes.ExperienceLevel <=
Events.ExperienceLevel THEN Classes.ExperienceLevel
ELSE Events.ExperienceLevel END
            END
        END ExperienceLevel, Results.Verified
        --Only looks at class level as max
        --ELSE
        --  CASE WHEN ISNULL(Classes.ExperienceLevel, 0) <=
Events.ExperienceLevel THEN ISNULL(Classes.ExperienceLevel,
0) ELSE Events.ExperienceLevel
END
        --END ExperienceLevel, Results.Verified
        FROM Results
            INNER JOIN Events ON Events.Event_ID) = Results.Event_ID
            INNER JOIN Classes ON Classes.Class_ID = Results.Class_ID
            WHERE (Classes.NoPoints IS NULL OR Classes.NoPoints = 0)
            AND Events.StartDate > GetDate( ) - 365
        ) d
    ) d
    INNER JOIN Hookit_PointsCalc p on d.place = p.place
    --NARROW LIST TO ONLY UPDATE RESULTS
    THAT ARE DIFFERENT
    Create Table #IndexPointsSmall(
        Result_ID UNIQUEIDENTIFIER NOT NULL PRIMARY KEY,
        ActualPoints FLOAT NOT NULL
    )
    INSERT INTO #IndexPointsSmall
    SELECT D.*
    FROM #IndexPoints d
        INNER JOIN Results on d.Result_ID= Results.Result_ID
        WHERE d.Result_ID = Results.Result_ID
        and IndexPoints <> ActualPoints
```

In addition to determinations relative to commitment and performance, the system 10 derives data related to the reach of an entity, which may provide an indication of the impact the entity has within the social networking platforms. The entity's impact on these virtual networking platforms is a major part of the overall value of that entity which is calculated by the system 10. However, with the significant number of users and the high volume of data per user, it can be difficult to successfully track, derive, and aggregate this data. Doing so in near real time and in an automated and consistent fashion, which is needed in order to provide accurate results, is a difficult task. To solve this problem, the system 10 uses a variety of hardware and data processing components as described relative to FIGS. 2D-2H.

Figure 2D:
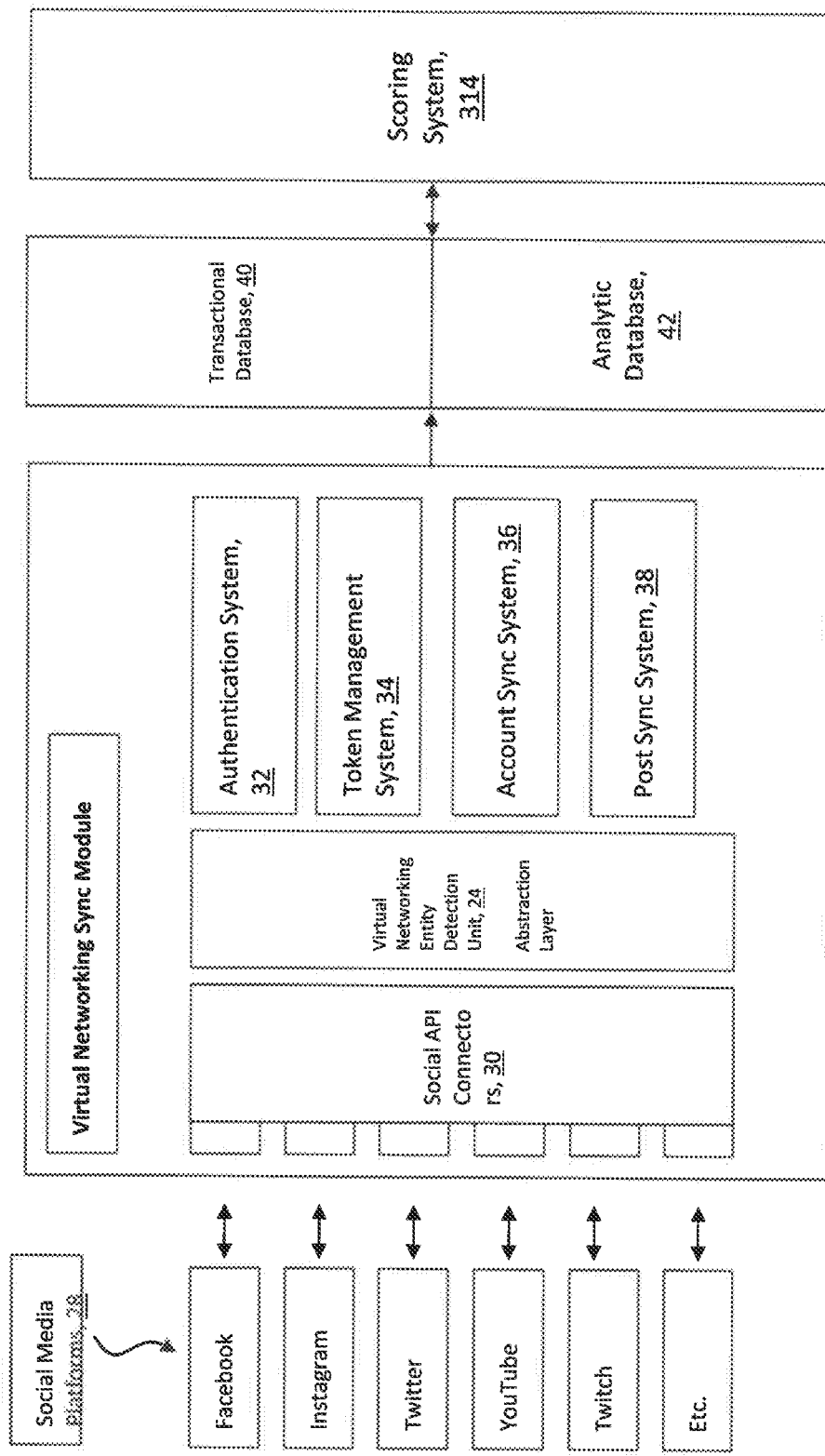

First, the virtual networking entity detection unit 24 has integrations with the virtual networking platforms 28 (FIG. 1) using APIs, which is designed in such a way to allow for the expansion and connection of new social media and networking platforms as they are designed and gain popularity. FIG. 2D is a diagram of architecture used by the virtual networking entity detection unit 24 to integrate with virtual networking platforms, in accordance with the first exemplary embodiment of the present disclosure. As shown, a variety of social media platforms 28 are connectable to the virtual networking entity detection unit 24 via social media API connectors 30.

Each of the platform APIs may have "rate limits" which are limits on the number of API calls or requests a 3rd party application can make and how much data they can aggregate. The rate limits are per authentication token or key. Each application that is approved to access the platform's API is provided one token. Depending on the platform, that one token may only be allowed to make 100 requests per day, for example, and each request may only return 100 social posts, meaning that each day the application could only get 100 posts from 100 user accounts (athlete, team, league, etc.). However, in order for the system 10 to operate successfully, the virtual networking entity detection unit 24 needs to automatically check and maintain post data for upwards of 250,000 accounts multiple times per day. In order to meet this demand and increase the number of requests the virtual networking entity detection unit 24 can make, and thus the number of accounts that can be checked, users of the system 10 may authenticate their social media accounts with the system 10.

In order to prevent fraudulent accounts from accessing the system 10, the virtual networking entity detection unit 24 includes a social account authentication system 32. The virtual networking entity detection unit 24 may receive one token for each entity, i.e., each athlete, team, league, etc. that has authenticated their social media account with the system 10. The token may be recorded in a token management system 34 to ensure that the tokens are being used appropriately and efficiently. The tokens can be used to make requests on that user's behalf, i.e., to get their social profile and post data, or it can be used to make requests for any other user that are being scored that had an account on that same platform.

Even with the bank of tokens and a system to optimize the use of them to allow for as many API requests as possible, there is still the risk of hitting rate limits of the social media platforms. If a rate limit is hit, it means that the virtual networking entity detection unit 24 cannot download the data needed to score an entity on that platform. Accordingly, to further optimize the timely aggregation of data, an account sync system 36 and post sync system 38 may be used to determine when to sync an account. The account sync system 36 and the post sync system 38 may look at past activity to determine when to sync a social media account of an entity. The higher the activity, the more often syncing of the post data may occur, which allows the system 10 to keep up with the new activity by that entity as it happens. Then, before the data is queried and analyzed to determine the score, a data warehouse having a transactional database 40 and analytic database 42 are used to store the relevant data in a format which allows for high-frequency updating. For example, the transactional database 40 and analytic database 42 are each a high performance data storage system, which was created to support the frequency of updates.

Further details of the components discussed relative to FIG. 2D, which are important for the virtual networking entity detection unit 24 in deriving the reach attributes, are provided herein. These components include the social API connectors 30; the social account authentication system 32; the token management system 34; the account & post sync systems 36, 38; and the data warehouse 40, 42.

With regards to social API connectors 30, once an application is approved by the social media platform 28, a connector is used to communicate with the API, which allows the virtual networking entity detection unit 24 to make requests for data, receive the data and store the data accordingly. The request format, rules, rate limits and the return data format all vary from platform to platform. Depending on the data needed, the request format will include the need to hit certain endpoints and in some cases, a platform may have a completely separate API for accessing certain data. The virtual networking entity detection unit 24 system is designed to take into account these varying factors and requirements. An example of sample API calls is provided as follows:

```
Example Instagram Endpoints:
Authorized Business IG:
URL =
https://graph.facebook.com/v2.12/{connectedNetwork.Source_ID}/media?limit={rowsPerPage}&fields
=permalink.id.ig_id.caption,
comments_count,like_count,thumbnail_url,media_type,media_url,is_comment_enable,timestamp,insig
hts.metric(impressions,reach, engagement,saved)&access_token=<accessToken>
Authorized Regular IG:
URL =
https://api.instagram.com/v1/users/{connectedNetwork.Source_ID}/media/recent?access_token=<acces
sToken>
Non-Authorized: (business discovery) - This method uses tokens from other authorized accounts
URL =
https://graph.facebook.com/<authorizedAcctUsername>?fields=business_discovery.username(<userna
me>){
followers_count,media_count,media.fields(permalink,id,caption,comments_count,like_count,media_url,
media_type,owner,timestamp).limit(25)} &access_token=<authorizedAcctAccessToken>
Facebook
URL =
https://graph.facebook.com/v3.2/{socialPost.Source_ID}/?fields=targeting,from,story,permalink_url,par
ent_id,sponsor_tags,status_type,id,promotable_id,message,caption,link,message_tags,with_tags,type,sou
rce,object_id,picture,full_picture,create_time,updated_time,likes.limit(0).summary(true),comments.lim
it(0).summary(true),shares,attachments,reactions.type(LIKE).summary(total_count).limit(0).as(like),rea
ctions.type(LOVE).summary(total_count).limit(0).as(love),reactions.type(WOW).summary(total_count)
.limit(0).as(wow),reactions.type(HAHA).summary(total_count).limit(0).as(haha),reactions.tyoe(SAD).s
ummary(total_count).limit(0).as(sad),reactions.type(ANGRY).summary(total_count).limit(0).as(angry),r
eaction.type(THANKFUL).summary(total_count).limit(0).as(thankful)&access_token=<accessToken>
```

Figure 2E:
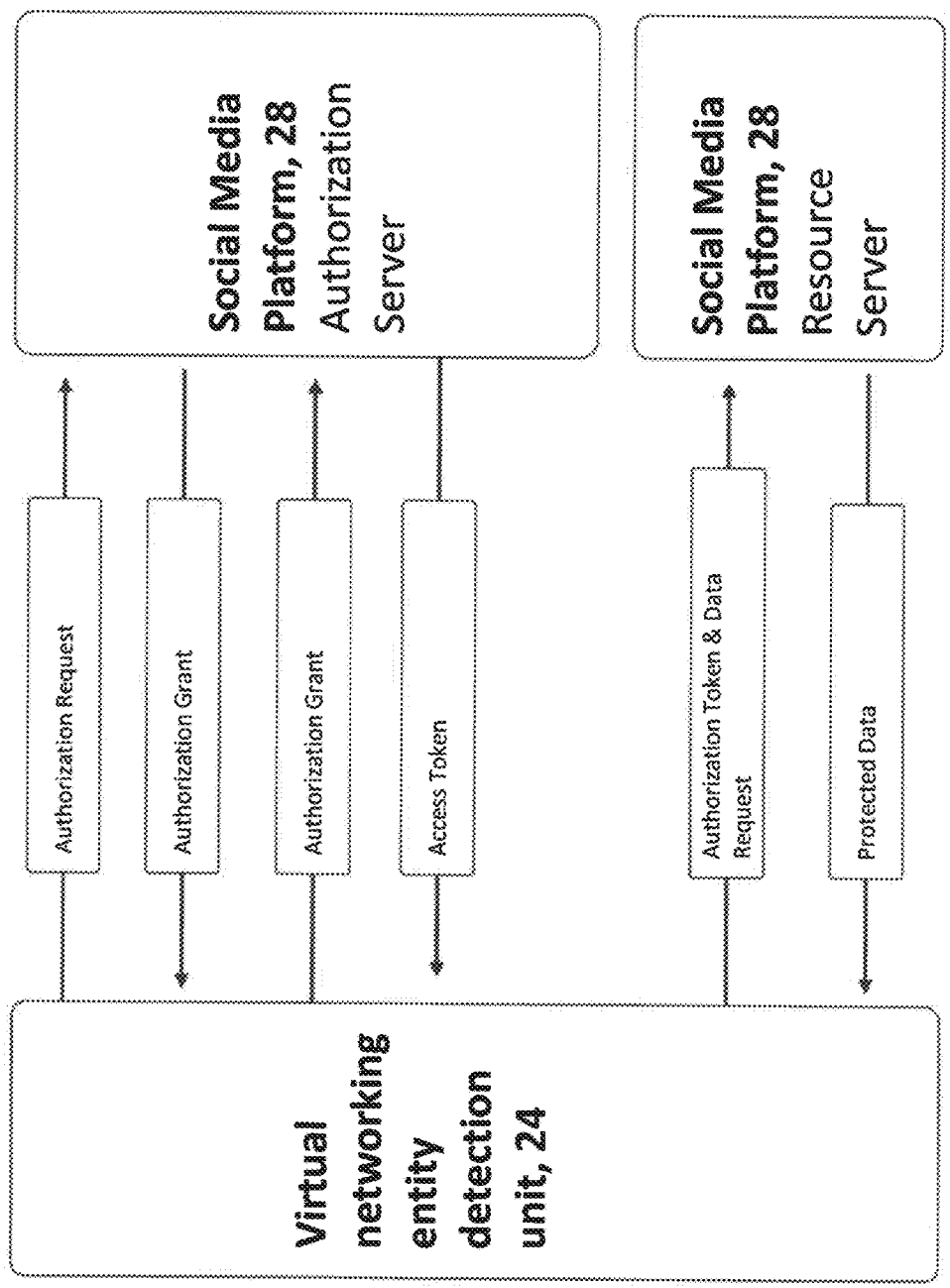

In order to get deeper data from the user, entities must authenticate their social media accounts using the social account authentication system 32. This authentication requires a deep integration with the social media APIs and a specific process and interface for the entity, as described relative to FIG. 2E. Authentication also provides for additional tokens that can be used for more API requests. The virtual networking entity detection unit 24 may use the OAuth 2.0 protocol, which provides an authorization framework which enables a third-party application to obtain limited access to an HTTP service, either on behalf of a resource owner by orchestrating an approval interaction between the resource owner and the HTTP service, or by allowing the third-party application to obtain access on its own behalf. In particular, as shown in FIG. 2E, the virtual networking entity detection unit 24, may submit an authorization request to an authorization server of a social media (virtual networking) platform 28. The authorization server may grant the authorization. When the granted authorization is submitted to the authorization server, an access token may be returned. This authorization token and a data request may then be made to a resource server of the social media platform 28, which allows for retrieval of protected entity data by the virtual networking entity detection unit 24. An example of the OAuth 2.0 two factor process is provided herein:

```
Step 1:
Dim RequestedPermissions =public_profile, user_friends,email,user_birthday, user_location, user_posts,
manage_pages, read_insights, instagram_basic, instagram_manage_insights
Response.Redirect("https://graph.facebook.com/oauth/authotize?client_id=157775474272800&redirect_
```

```
uri=" & Server.UrlEncode("http" & If(Request.IsSecureConnection, "s", " ") & "://" &
DataLayer.Communities.Current.Domain & "/services/fb/connectnew.aspx?action=" &
Request.QueryString("action") & If(Request.QueryString("Mobile") IsNot Nothing, "&mobile=true", " "
& If(Request.QueryString("NativeApp") IsNot Nothing, "&nativeapp=true", " ")) & "&scope=" &
RequestedPermissions & If(Request.QueryString("Mobile") IsNot Nothing, "&display=touch", " "))
Step 2:
Private Function GetAccessToken(ByVal code As String) As Tuple(Of String, DateTime?)
    Dim Webclient As New Net.WebClient
    Dim ClientResponse As JObject =
JsonConvert.DeserializeObject(WebClient.DownloadString("https://graph.facebook.com/oauth/access_to
ken? client_id=157775474272800&redirect_uri=" & Server.UrlEncode("http" &
If(Request.IsSecureConnection, "s", " ") & "://" & DataLayer.Communities.Current.Domain &
"/services/fb/connectnew.aspx?action=" & Request.QueryString("action") &
If(Request.QueryString("Mobile") IsNot Nothing, "&mobile=true", " ") &
If(Request.QueryString("NativeApp") IsNot Nothing, "&nativeapp=true", " ")) &
"&client_secret=d617cfc27a74c47d4391cec1eeb3b072&code=" & code))
    ClientResponse =
JsonConvert.DeserializeObject(WebClient.DownloadString("https://graph.facebook.com/oauth/access_to
ken?
client_id-157775474272800&client_secret=d617cfc27a74c47d4391cecieeb3b072&grant_type=fb_exch
ange_token&fb_exchange_token=" & ClientResponse("access_token").ToString))
    Dim AccessToken As String = ClientResponse("access_token").ToString
    Dim ExpiresIn = ClientResponse("expires_in")
    Dim Expires As DateTime? = Nothing
    If Not String.IsNullOrWhiteSpace(ExpiresIn) Then
        Expires = DateTime.Now.AddSeconds(ExpiresIn)
    End If
    Return New Tuple(Of String, DateTime?)(AccessToken, Expires)
End Function
```

Figure 2F:
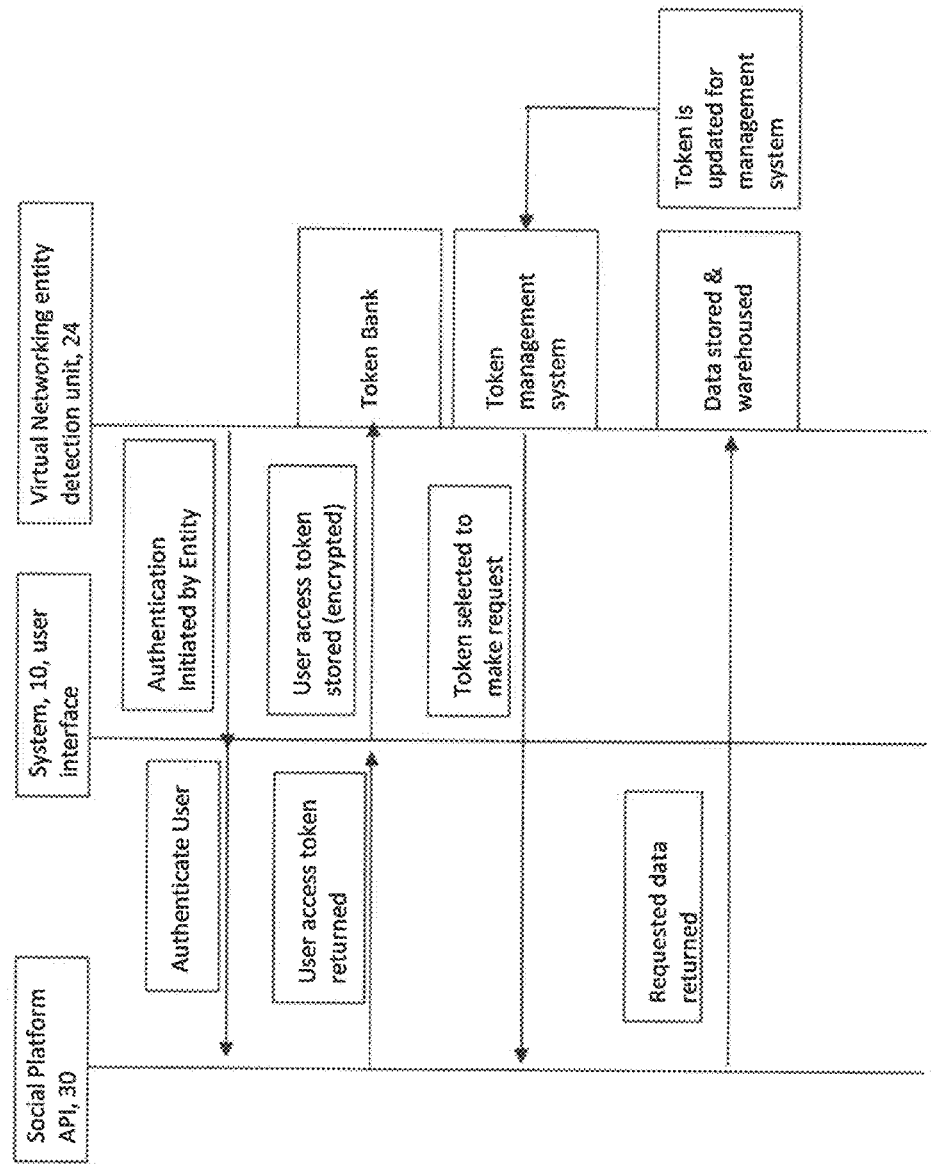

The token management system 34 may allow for the system 10 to maximize requests that can be made against the API endpoints. FIG. 2F provides a diagram example of the token management system 34, in accordance with the first exemplary embodiment of the present disclosure. As shown, the token management system 34 may receive the token and enter it into the token bank. Access tokens have rate limits built into them. Accounts with larger number of posts and interactions have higher rate limits. The token management system 34 determines what token to use based on the type of request that needs to be made, the last time the token was used and any rate limiting criteria a particular platform has in place. In some cases, a social media platform will require that the token be owned by the user the request is being made for, e.g., with requests for deeper insights data. For unauthorized accounts, the token management system 34 may attempt to get data using an authorized token. If that token fails for any reason, the token management system 34 will try using a different authorized access token. It is noted that the token management system 34 may return an entities token if ObjectAccessTokenOnly=true. Otherwise it will cycle through a list of tokens (VK, Youtube, GoogleMaps) or it will grab the 5,000 most recent authorized access tokens for that same social media network the system 10 is currently interacting with. For each connected network that is authorized, the token management system 34 may store their token for that network/social media handle combo.

An example of the process for cycling through tokens is provided herein:

```
Dim AccessToken As String = Nothing
If Member_ID <>Nothing Then
    Using cmd As New SqlCommand("SELECT AccessToken FROM ConnectedNetworks
WHERE Member_ID = @Member_ID And Source = @Source And Authorized = 1")
        cmd.Parameters.AddWithValue("@Member_ID", Member_ID)
        cmd.Parameters.AddWithValue("@Source", Source)
        AccessToken = CType(DataLibrary.Database.ExecuteScalar(cmd,
GetType(DataObjects.ConnectedNetwork)), String)
        If AccessToken <>Nothing Then AccessToken =
AccessToken.Replace("access_token=", "").Split("&"c)(0)
    End Using
End If
If AccessToken = Nothing AndAlso (Member_ID = Nothing OrElse ObjectAccessTokenOnly
= False) Then
    Dim MinAccessTokenCount As Integer = 1000
    If Source = Source.YouTube Then
        MinAccessTokenCount = 2
    ElseIf Source = Source.GoogleMaps Then
        MinAccessTokenCount = 1
    End If
    If Not ValidAccessTokens.ContainsKey(Source) OrElse ValidAccessTokens(Source).Count
< MinAccessTokenCount Then
        SyncLock ValidAccessTokens
            If ValidAccessTokens.ContainsKey(Source) Then
                ValidAccessTokens(Source).Clear( )
            Else
                ValidAccessTokens.Add(Source, New Generic.List(Of String))
```

```
    End If
    If Source = Source.Instagram Then
        For Each Item As DataObjects.EmptyContainer In New
DataLibrary.DataObjectCollectionBase(Of DataObjects.EmptyContainer)("SELECT TOP 10000
AccessToken FROM ConnectedNetworks WHERE Source = " & CType(Source, Integer) & "
And
Authorized = 1 And LastAuthorizedDate >='6/1/2016 4:53 PM' ORDER BY LastAuthorizedDate
DESC")
            Item("AccessToken") = Item("AccessToken").ToString.Replace("access_token=",
"").Split("&"c)(0) ' clean it up if needed
            If Not ValidAccessTokens(Source).Contains(Item("AccessToken").ToSting)
Then ValidAccessTokens(Source),Add(Item("AccessToken").ToString) ' Add it
        Next
    Else
        For Each Item As DataObjects.EmptyContainer In New
DataLibrary.DataObjectCollectionBase(Of DataObjects.EmptyContainer)("SELECT TOP 5000
AccessToken FROM ConnectedNetworks WHERE Source = " & CType(Source, Integer) &
"AND
Authorized = 1 ORDER BY LastAuthorizedDate DESC")
            Item("AccessToken") = Item("AccessToken").ToString.Replace("access_token=",
"").Split("&"c)(0) ' clean it up if needed
            If Not ValidAccessTokens(Source).Contains(Item("AccessToken").ToString)
Then
                ValidAccessTokens(Source).Add(Item("AccessToken").ToString) ' Add it
        Next
    End If
    End SyncLock
End If
Static Random As New Random
    AccessToken = ValidAccessTokens(Source)(Random.Next(0,
ValidAccessTokens(Source).Count - 1))
End If
Return AccessToken
```

Next, the account sync system 36 and post sync system 38 may be important in order to ensure that the virtual networking entity detection unit 24 is getting social media posts and syncing them in near real-time. The account sync system 36 is used to pull new posts and is based on the user posting habits. If a user only posts once every three days on average, the account sync system 36 will direct the account to only be synced every three days. This optimizes the use of tokens for API requests and processing bandwidth. Similarly, if a user posts six times per day, the account sync system 36 will sync their account every 4 hours, or in accordance with another, similar period of time. The account sync system 36 constantly updates itself based on analysis of new posting behaviors of the entities. Post syncing may be more dynamic, since social posts accrue new interactions (likes, comments, shares, etc.) for a long period of time after posting. Thus, the post sync system 38 system will need to continually check with the social API 30 to get the new interaction count and store it, which ensures that the data in the virtual networking entity detection unit 24 is as current as possible. The frequency that a post is synced may be based on the interactions it accrues. Each post may be synced soon after first aggregating it, then again hours later. Using those two data points—the initial sync and the second sync—the post sync system 38 will determine when to sync it next. And, each time a post is synced, the post sync system 38 may determine when to sync it next based on the historical behavior. The post sync system 38 also takes into account typical interaction trends for the user.

The account sync system determines when to check for new posts on a particular user's social media platform account. An example algorithm for the account sync is provided herein:

```
Calculate when a Connected Network will sync next:
DECLARE @Local_Member_ID uniqueidentifier = @Member _ ID
DECLARE @Local_Source    tinyint = @Source
DECLARE @PostsPerDay_1 float = 0
DECLARE @PostsPerDay_2 float = 0
DECLARE @PostsPerDay_3 float = 0
DECLARE @PostsPerDay_4 float = 0
SELECT @PostsPerDay_1 = COUNT(*) / 30.0 FROM SocialPosts WHERE Member_ID =
@Local_Member_ID AND Source = @Local_Source AND CreatedDate > DateAdd(day, -30, GetDate( ))
SELECT @PostsPerDay_2 = COUNT(*) / 14.0 FROM SocialPosts WHERE Member_ID =
@Local_Member_ID AND Source = @Local_Source AND CreatedDate > DateAdd(day, -14, GetDate( ))
SELECT @PostsPerDay_3 = COUNT(*) / 7.0 FROM SocialPosts WHERE Member_ID =
@Local_Member_ID AND Source = @Local_Source AND CreatedDate > DateAdd(day, -7, GetDate( ))
SELECT @PostsPerDay_4 = COUNT(*) / 1.0 FROM SocialPosts WHERE Member_ID =
@Local_Member_ID AND Source = @Local_Source AND CreatedDate > DateAdd(day, -1, GetDate( ))
DECLARE @PostsPerDay float = @PostsPerDay_1
IF @PostsPerDay < @PostsPerDay_2 SET @PostsPerDay = @PostsPerDay_2
IF @PostsPerDay < @PostsPerDay_3 SET @PostsPerDay = @PostsPerDay_3
IF @PostsPerDay < @PostsPerDay_4 SET @PostsPerDay = @PostsPerDay_4
DECLARE @NextScheduledDate datetime = NULL
IF @PostsPerDay < .11 SET @NextScheduledDate = DateAdd(hour, 72, GetDate( ))
```

```
IF @PostsPerDay BETWEEN .11 AND .25 SET @NextScheduledDate = DateAdd(hour, 48, GetDate( ))
IF @PostsPerDay BETWEEN .25 ,AND .5 SET (@NextScheduledDate = DateAdd(hour, 24, GetDate( ))
IF @PostsPerDay BETWEEN .5 AND 1 SET @NextScheduledDate = DateAdd(hour, 12, GetDate( ))
IF @PostsPerDay BETWEEN 1 AND 2 SET @NextScheduledDate = DateAdd(hour, 6, GetDate( ))
IF @PostsPerDay BETWEEN 2 AND 3 SET @NextScheduledDate = DateAdd(hour, 3, GetDate( ))
IF @PostsPerDay BETWEEN 3 AND 4 SET @NextScheduledDate = DateAdd(hour, 2, GetDate( ))
IF @PostsPerDay BETWEEN 4 AND 5 SET @NextScheduledDate = DateAdd(hour, 2, GetDate( ))
IF @PostsPerDay >= 5 SET @NextScheduledDate = DateAdd(hour, 1, GetDate( ))
-- If you are participating in an event, sync all accounts every 3 hour
DECLARE @EventFormula datetime = NULL
IF EXISTS (
SELECT Events.Event_ID FROM Events
INNER JOIN EventParticipants ON EventParticipants.Event_ID = Events.Event_ID AND
EventParticipants.HookitMember_ID = @Local_Member_ID
CROSS APPLY (SELECT COUNT(*) ChildEvents FROM Events ChildEvents WHERE
ChildEvents.ParentEvent_ID = Events.Event_ID) ChildEventData
CROSS APPLY (SELECT COUNT(*) ChildEvents FROM ParentEvents WHERE
ParentEvents.ParentEvent_ID = Events.Event_ID) OtherChildEventData
    WHERE GetDate( ) BETWEEN DateAdd(day, -3, StartDate) AND DateAdd(day, 3, EndDate)
    AND ChildEventData.ChildEvents = 0 AND OtherChildEventData.ChildEvents = 0
    AND DateDiff(day, StartDate, EndDate) < 30
)
BEGIN SET @EventFormula = DateAdd(HOUR, 3, GetDate( )) END
RETURN ISNULL(@EventFormula, @NextScheduledDate)
```

Similarly, each individual post that is aggregated into the system, which is often measured in the millions per day, needs to be checked for new social interactions. The activity and age of the post help determine the sync frequency by the post sync system 38. In one example, the following steps are taken for each post. First, a primary stat value on the post is determined. This includes the number of hours (including fractional hours) the post has existed, and the total interactions of the posts, e.g., the number of likes plus comments plus shares plus views. Next, the average interactions per hour is determined, which may be calculated based on total interactions over a lifetime of the post. That number is then divided by the number of months the post has existed (to degrade the formula over time). Then, that possibly degraded number is divided based on InteractionsPerHour by @Threshhold. The resulting value is multiplied by @Interval, which is then multiplied by 60 (or another constant). The end value gives the post sync system 38 the number of minutes until the post sync should be updated again.

An example of the post sync algorithm is provided herein:

```
Calculate when a social post will be updated next:
DECLARE @Local_SocialPost_ID int = @SocialPost_ID
DECLARE @RecordState tinyint
DECLARE @CreatedDate datetime
DECLARE @LastUpdatedDate datetime
DECLARE @Member_ID    uniqueidentifier
DECLARE @TotalInteractions bigint
SELECT @Member_ID = Member_ID,@LastUpdatedDate = LastUpdatedDate, @CreatedDate =
CreatedDate, @RecordState = RecordState, @TotalInteractions = (CONVERT(bigint, Likes) +
Comments + Shares + Views) FROM SocialPosts WHERE SocialPost_ID = @Local_SocialPost_ID
    IF ISNULL(@RecordState, 1) > 1 RETURN NULL
    if (Datediff(day, @CreatedDate,getdate( ))) >= 14 RETURN NULL
    IF @TotalInteractions < 5000 AND @CreatedDate < DateAdd(day, -30, GetDate( )) RETURN
NULL
    IF @CreatedDate < DateAdd(month, -1, GetDate( )) RETURN NULL
    -- Our max value. We won't ever schedule anything past this date. Max is 3 months (Quarterly)
    DECLARE @MaxValue datetime = DateAdd(month, 1, GetDate( ))
    DECLARE @MinValue datetime = DateAdd(hour, 24, GetDate( ))
    DECLARE @IgnoreMinValue bit = 0
    -- for every month the post has aged, set the next update to that times 7 days.
    -- First month is weekly, second month in every 2 weeks, etc.
    DECLARE @DefaultFormula datetime = DateAdd(day, ( DateDiff(month, @CreatedDate,
GetDate ( )) + 1 ) * 7, GetDate( ))
    -- "Expedited" Formula
    DECLARE @ExpeditedFormula datetime = NULL
    IF @CreatedDate >= DateAdd(day, -1, GetDate( )
    BEGIN SET @ExpeditedFormula = DateAdd(day, 1, GetDate( )) END
    DECLARE @Threshhold float = 100
    DECLARE @Interval float = .25 --Minimum update interval (and interval multiplier)
    DECLARE @FormulaVersion datetime = NULL
    SELECT @FormulaVersion = DateAdd(minute, (dbo,Clamp(@Threshhold /
((TotalInteractions / Lifetime) / (DateDiff(month, CreatedDate, GetDate( )) + 1)), 1, 10000000) *
@Interval) * 60, GetDate( ))
        FROM (
            SELECT (CASE WHEN TotalInteractions < 1 THEN 1 ELSE TotalInteractions END)
TotalInteractions, (CASE WHEN Lifetime < 1 THEN .016 ELSE Lifetime END) Lifetime, (CASE
WHEN CreatedDate > GetDate( ) THEN Date.Add(minute, -1, GetDate( )) ELSE CreatedDate END)
```

```
CreatedDate FROM (
    SELECT (CONVERT(bigint, Likes) + Comments + Shares + Views)
TotalInteractions, (DateDiff(minute, CreatedDate, GetDate( )) / 60.0) Lifetime, @CreatedDate
CreatedDate
    FROM SocialPosts WHERE SocialPost_ID @Local_SocialPost_ID
    ) d
) d
-- If you are participating in an event, update all posts 3 days before and after the event every
30 minutes (only posts posted in that range)
  DECLARE @EventFormula datetime = NULL
  DECLARE @NextSecheduledUpdate datetime = @MaxValue
  IF @DefaultFormula IS NOT NULL AND @DefaultFormula < @NextScheduledUpdate SET
@NextScheduledUpdate = @DefaultFormula
  IF @ExpeditedFormula IS NOT NULL AND @ExpeditedFormula < @NextScheduledUpdate
SET @NextScheduledUpdate = @ExpeditedFormula
  IF @FormulaVersion IS NOT NULL AND @FormulaVersion < @NextScheduledUpdate SET
@NextScheduledUpdate = @FormulaVersion
  IF @EventFormula IS NOT NULL AND @EventFormula < @NextScheduledUpdate SET
@NextScheduledUpdate = @EventFormula
  IF @IgnoreMinValue = 0 AND @NextScheduledUpdate < @MinValue SET
@NextScheduledUpdate =@MinValne
  RETURN @NextScheduledUpdate
```

Figure 2G:
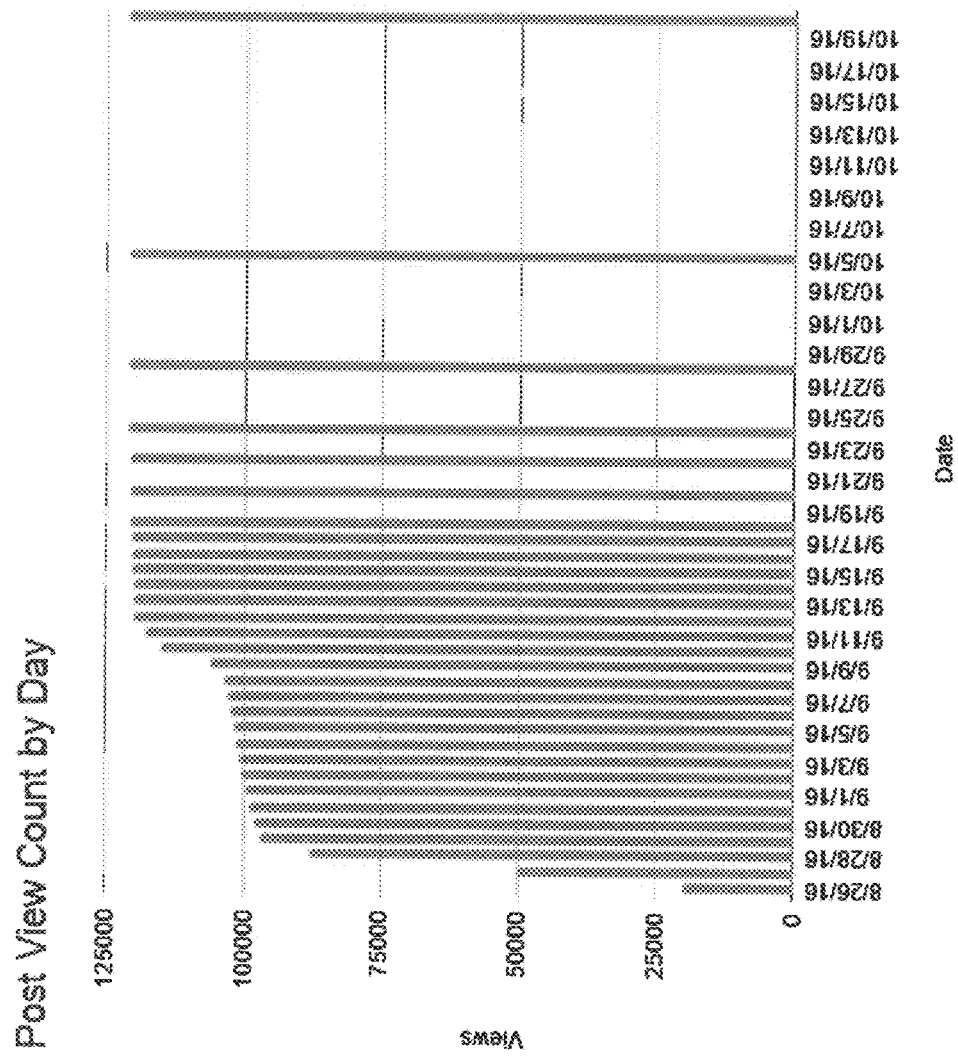
Figure 2H:
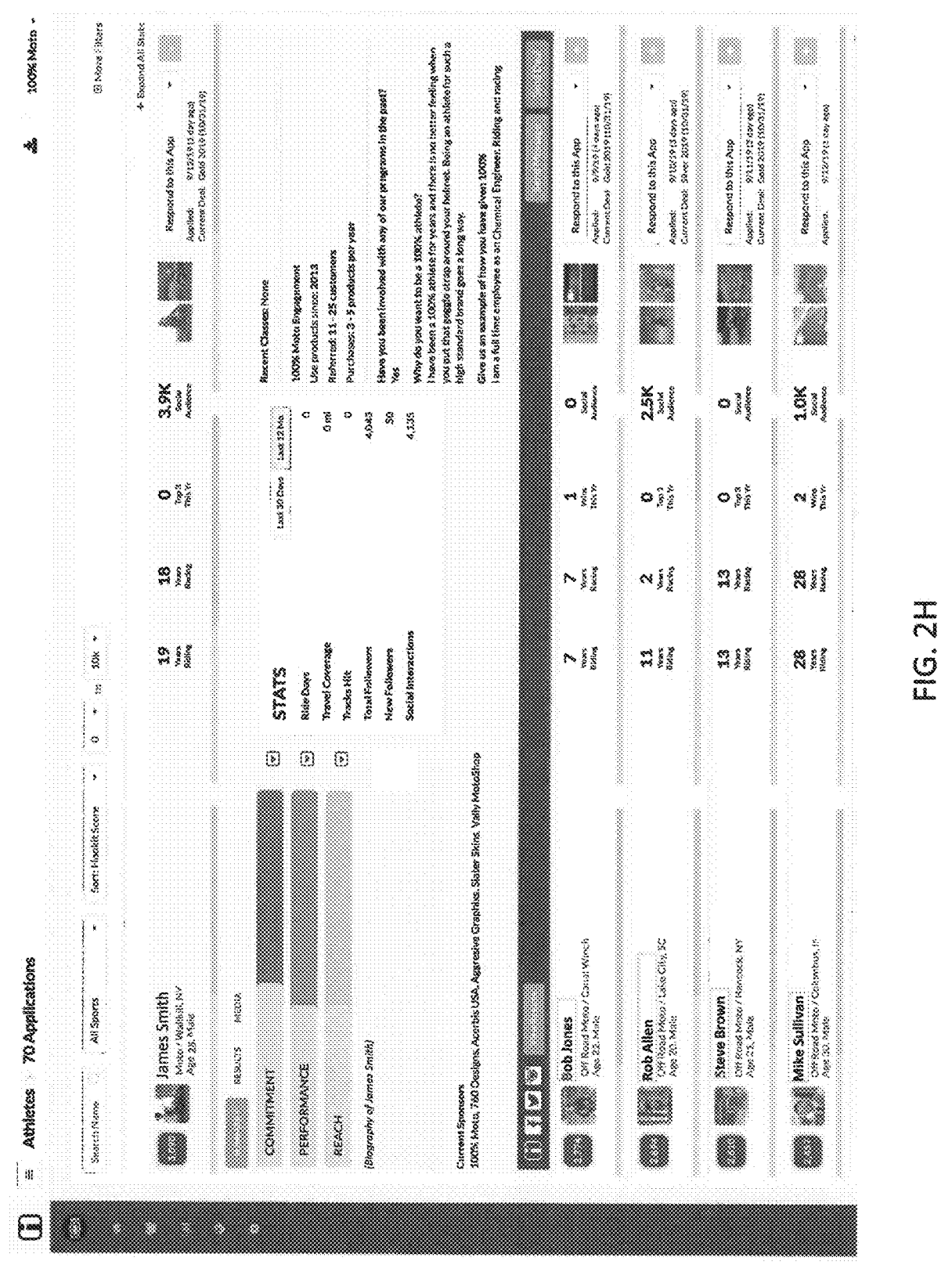

FIG. 2G is a graph which illustrates an example of syncing intervals of post syncs, where the number of interactions (identified on the Y axis) start to flatten over time (identified on the X axis), where syncing slows over the life of the post.

The transactional database 40 or data warehouse, and analytic database 42, may be important to ensuring that the volume of data processed can be carried out in near real time. Indeed, one of the key aspects to being able to calculate scores based on the volume of data the system 10 receives, in combination with the many different users so often, is in how the data is stored. The transactional database 40 and analytic database 42 uses a combination of a relational database for configuration and transactional processes and a modern, cloud based data warehouse to get the data into an analytic-ready state for the score to be calculated off of. The data warehouse is a columnar database with vectorized execution where adaptive optimization ensures queries are highly performant.

FIG. 2H is an illustration of a screen image of a dashboard interface of the system 10, in accordance with the first exemplary embodiment of the present disclosure. In particular, FIG. 2H illustrates an exemplary dashboard interface that a user would see when using the system 10. The dashboard in this example is for a particular athlete (James Smith) and it provides various data points about this athlete, such as a marketability assessment value ("3,090") along with various other data points used to derive the marketability assessment value, such as a commitment score, a performance score, and a reach score. Other data can also be displayed, such as a biography of the athlete, stats of the athlete, and engagement specifics of the athlete, including their virtual networking or social media audience. The dashboard may also display other athletes who are similar to the primary athlete, such that a viewer can compare various entities. This dashboard will allow companies and other entities the ability to see all relevant information about an athlete, which in turn, will allow them to make better sponsorship decisions. The example of FIG. 2H, branded company reviewing sponsorship applications within the system 10 can quickly separate athletes based on overall score and individual sub scores in order to make an informed decision based on the data metrics from the athlete's virtual networking impact.

FIGS. 3-21 provide additional examples of the system 10, as discussed relative to FIGS. 1-2H, with relation to athlete entities and how the system 10 can be used to provide numerical value assessments (scores) to quantify the impact the athlete has within the virtual world of social networking platforms and elsewhere.

Figure 3:
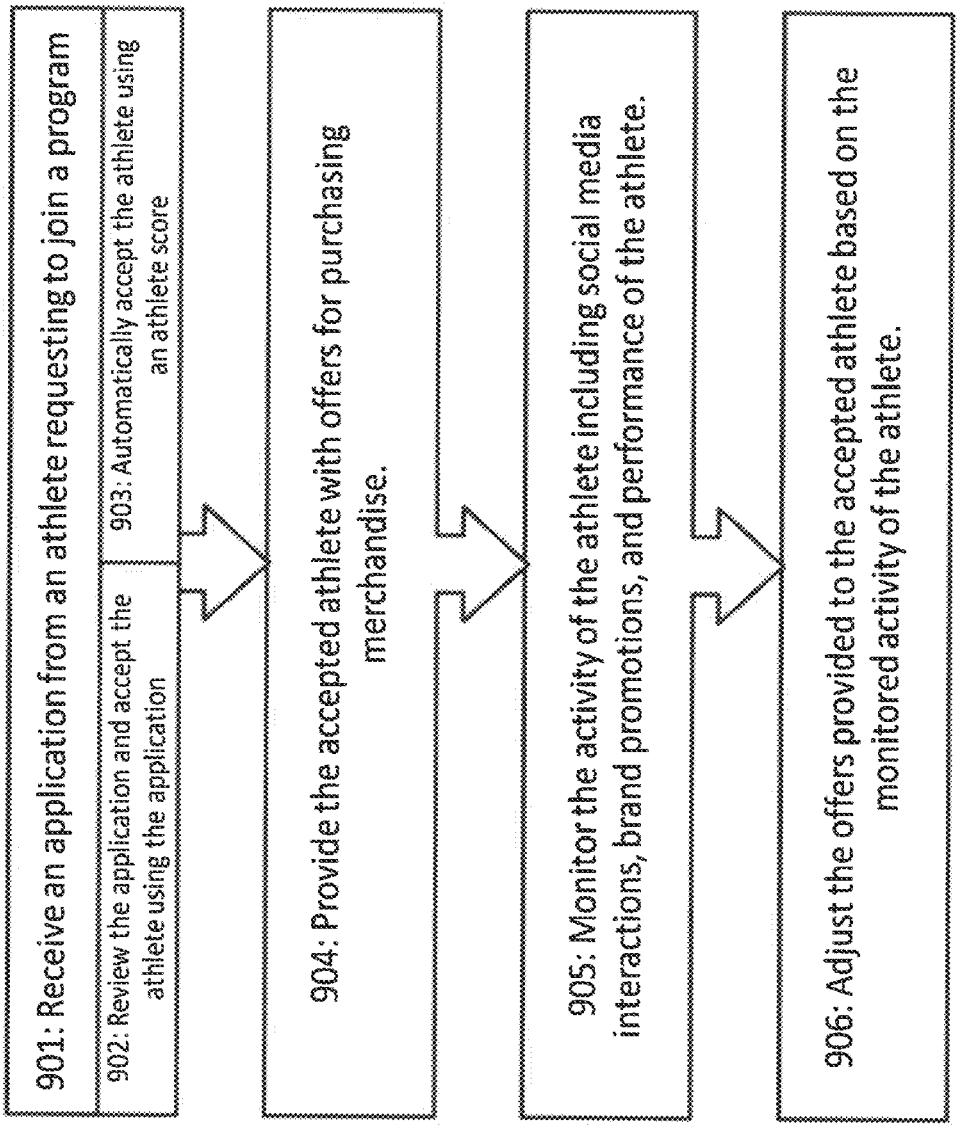
FIG. 3 is a diagram illustrating an example of a method for promoting a brand or company, in accordance with the first exemplary embodiment of the present disclosure.

FIG. 3 is a diagram illustrating an example of a method for promoting a brand or a company. Referring to FIG. 3, in step 901, a user may receive an application from an athlete requesting to join a program and may review the application and accept the athlete in step 902 or may automatically accept the athlete using an athlete score in step 903. The user may then provide the accepted athlete with offers for purchasing merchandise, monitor the activity of the athlete, and adjust the offers provided to the athlete based on the monitored activity, as illustrated in steps 904, 905, and 906, respectively.

Figure 4:
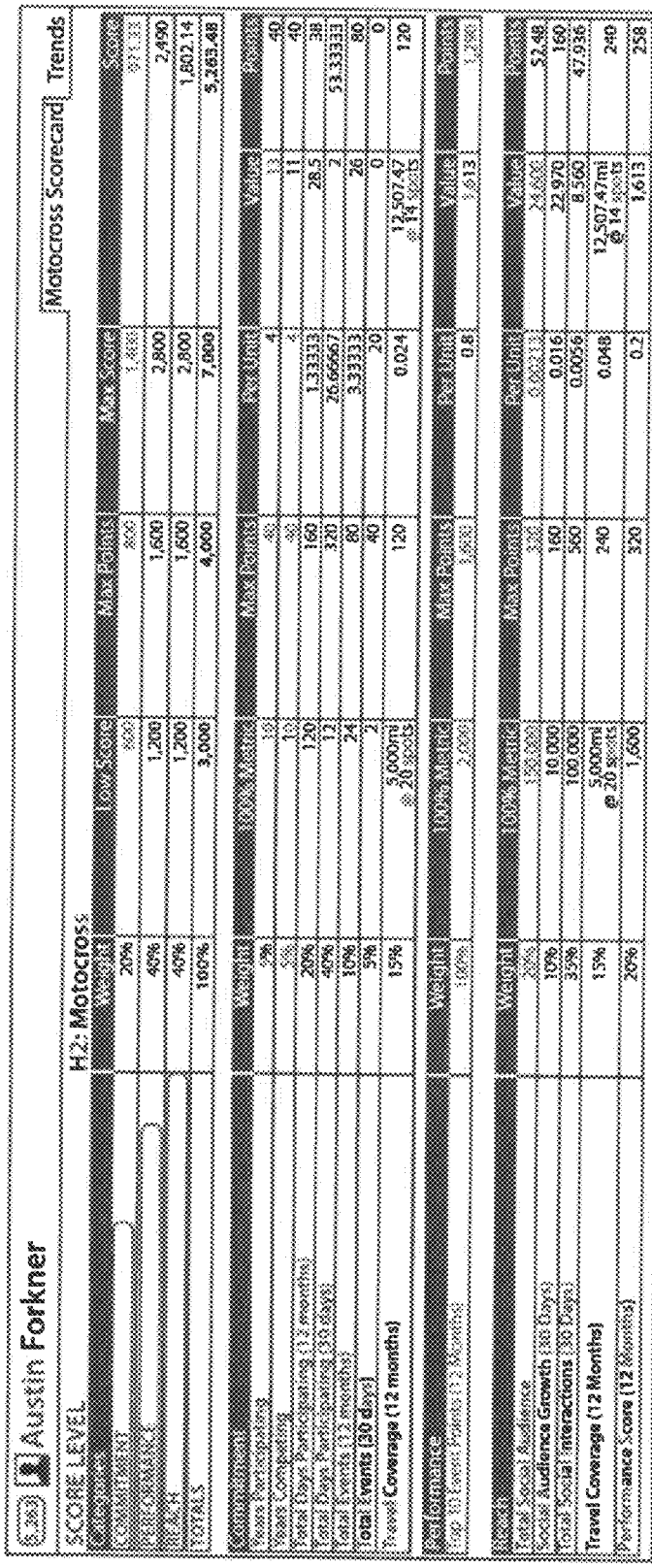
FIG. 4 is a diagram illustrating an example of an athlete score for an athlete who belongs to an H2 hierarchy and the athlete score is a weighted value of a commitment score, a performance score, and a reach score, in accordance with the first exemplary embodiment of the present disclosure.

FIG. 4 is a diagram illustrating an example of an athlete score for an athlete who belongs to an H2 hierarchy and the athlete score is a weighted value of a commitment score, a performance score, and a reach score.

An athlete score is a number value for helping an athlete or company measure an athlete's value. The athlete score may be used by the athlete in comparing themselves to their own personal goals or to other athletes. The athlete score may be used by a company for comparing the athlete to other athletes for marketing, sponsorship, or other financial based purposes. Further, the athlete score may be publicly available for any individual such as a fan or media critic for comparing or assessing one or more athletes. In another example, the athlete score may be privately available to a select group or an individual such as any one or more of the athlete, a coach, a mentor, or team members for assessing or comparing one or more athletes. The athlete score may be referred to as a total impact score.

Referring to FIG. 4, the athlete score is a number value which ranges from 0 to 1,000, but is not limited thereto. That is, the athlete score may be a number value within any range of values. The athlete score may be a value for an individual athlete such as in this example where the athlete value is for Austin Forkner. For example, the athlete score is a number value of 5,263.48 as shown under the "Score" column and the "Totals" row of FIG. 4.

The athlete score is a number value that is calculated based on different factors each having a number value. For example, the athlete score is calculated based on a value for an athlete's commitment, a value for an athlete's performance, and a value for an athlete's reach. Each of these values may be weighted equally to formulate the athlete score or may be weighted differently. In this example, the commitment, performance, and reach values are weighted differently at 20%, 40%, and 40%, respectively. Additionally, each of the commitment, performance, and reach values, may be calculated based on one or more factors which are weighted equally or differently to formulate each of the commitment, performance, and reach values.

For example, the commitment value for an athlete may be based on factors including one or more of the number of years the athlete participated or has been playing the sport, the number of years the athlete competed in the sport, the total number of days the athlete has participated in the sport over the past 2 months, the total number of days the athlete has participated in the sport over the past 30 days, the total number of events the athlete has participated in over the past 12 months, the total number of events the athlete has participated in over the past 30 days, and the travel coverage of the athlete over the past 12 months.

In this example, the commitment value is based on all of the above factors weighted at different percentages. The number of years the athlete participated or has been playing the sport is weighted at 5%, the number of years the athlete competed in the sport is weighted at 5%, the total number of days the athlete has participated in the sport over the past 2 months is weighted at 20%, the total number of days the athlete has participated in the sport over the past 30 days is weighted at 40%, the total number of events the athlete has participated in over the past 12 months is weighted at 10%, the total number of events the athlete has participated in over the past 30 days is weighted at 5%, and the travel coverage of the athlete over the past 12 months is weighted at 15%, thus making up 100% of the athlete's commitment value.

The performance value may also be based on one or more factors. For example, the performance value may be based on one or more of top 10 event points obtained over the past 12 months, all event points obtained over the past 12 months, and other statistics of an athlete's performance depending on their sport such as the number of touchdowns, receptions, tackles, rushing yards, field goals, home runs, base hits, goals, assists, among other statistics which should be appreciated by one of ordinary skill in the art. Each of these factors may be weighted equally or differently. In this example, the performance value is based exclusively on the top 10 event points obtained over the past 12 months, thus making up 100% of the athlete's performance value.

The reach value of an athlete may also be based on one or more values. The reach of an athlete may be a value which rates the athlete based on their influence or popularity within a confined group, a confined geographic region, or all over the world. Factors which may be weighted equally or differently include one or more of total social audience, audience growth over the past 30 days, total social interactions over the past 30 days, the athlete's travel coverage over the past 12 months, and the athlete's performance value or score. It should be appreciated that the time period over which a certain factor is monitored and considered is not limited to those described herein for any of the commitment, performance, or reach values or scores.

In this example, the reach value is based on all of the above factors weighted at different percentages. Total social audience is weighted at 20%, audience growth over the past 30 days is weighted at 10%, total social interactions over the past 30 days is weighted at 35%, the athlete's travel coverage over the past 12 months is weighted at 15%, and the athlete's performance value or score is weighted at 20%, thus making up 100% of the athlete's reach value.

In an example, the reach value may be based on a virtual networking or social media platforms such as Facebook, Twitter, Instagram, and other social media platforms where human users interact with one another using computerized virtual platforms. Social media factors which are considered for determining the reach value of the athlete include, but are not limited to, the number of Facebook fans or friends an athlete has, the number of Twitter or Instagram followers an athlete has, the number of likes an athlete has received for comments or pictures posted over a past period of time, and the number of retweets and favorites an athlete has received over a past period of time. Additionally, the interaction of an athlete with a social media platform may be considered for determining the reach of the athlete. For example, the number of posts or shares the athlete publishes per day, the number of comments the athlete published over a past period of time, and other interactions of the athlete on the social media platform. Also, the performance score of an athlete may be a factor used for calculating the athlete's reach score. Such social media data may be automatically detected from social media platforms and transmitted to an athlete score generating device 100 that is further described below in reference to FIG. 8.

The performance or attendance of different events may be weighted differently based on the impact of a major event. That is, factors of each of the commitment score, performance score, or reach score relating to a particular event may be multiplied based on the importance or impact of such an event. Accordingly, data obtained from different events may be equally weighted or weighted differently.

Figure 5:
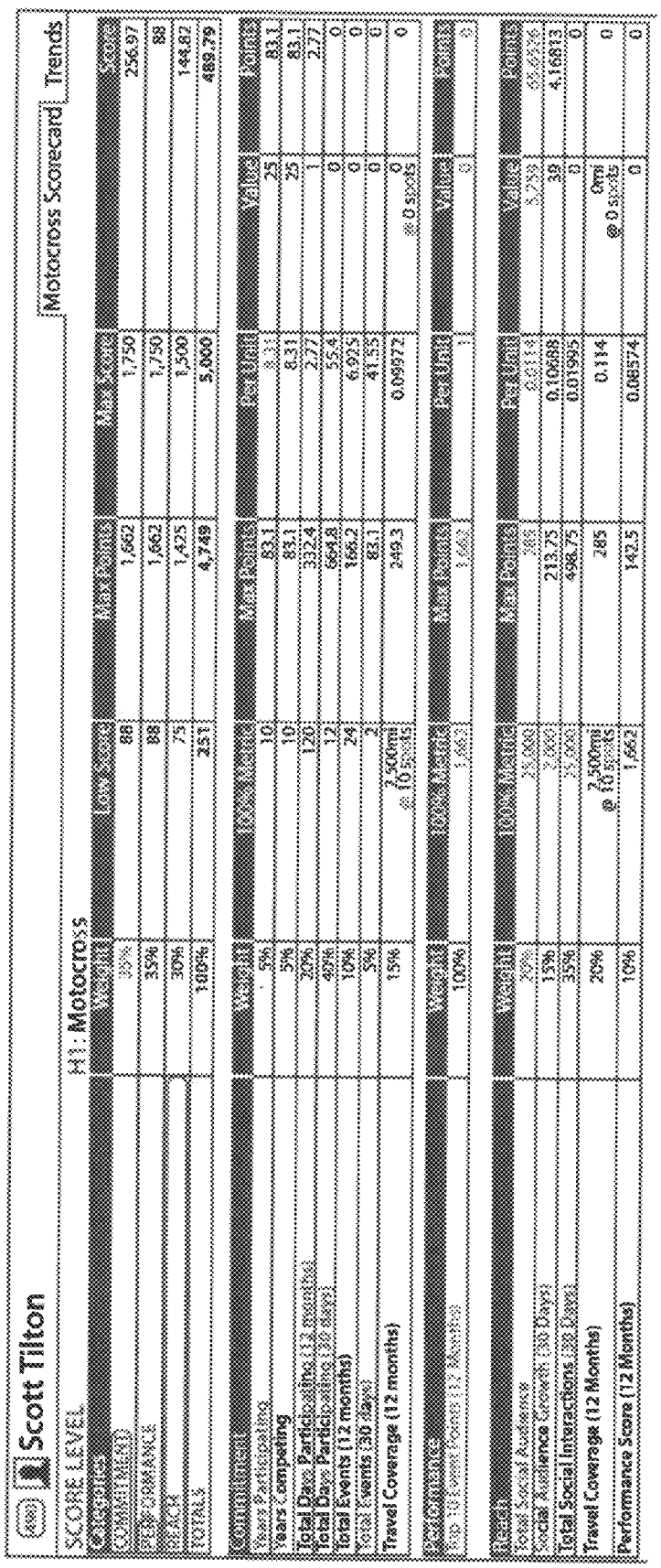
FIG. 5 is a diagram illustrating an example of an athlete score for an athlete who belongs to an H1 hierarchy and the athlete score is a weighted value of a commitment score, a performance score, and a reach score, in accordance with the first exemplary embodiment of the present disclosure.
Figure 6:
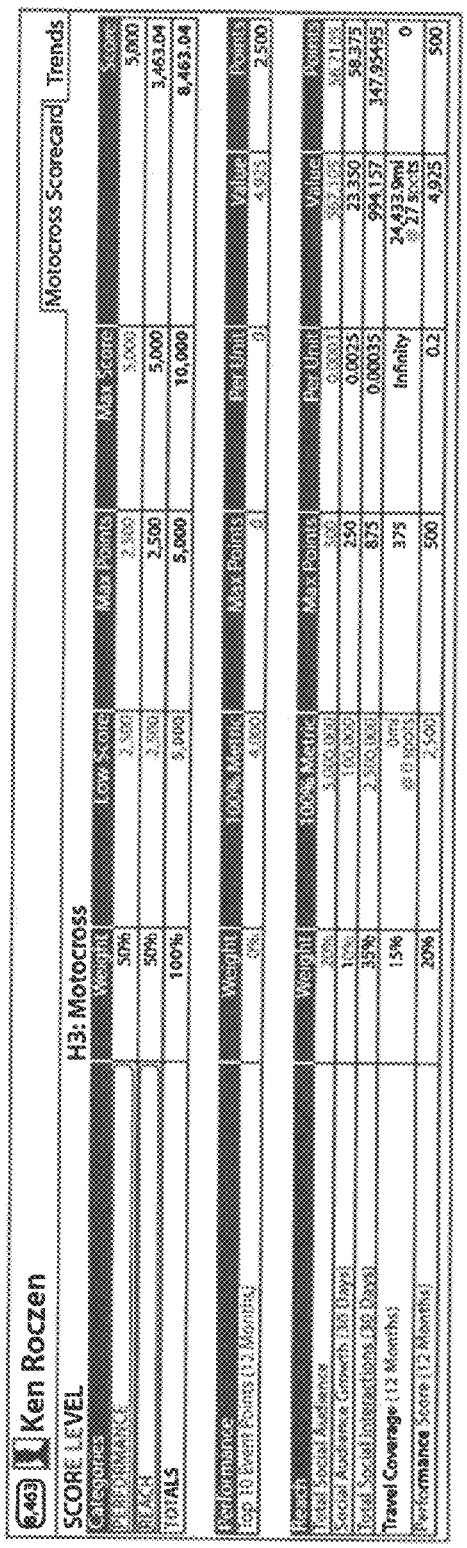
FIG. 6 is a diagram illustrating an example of an athlete score for an athlete who belongs to an H3 hierarchy and the athlete score is a weighted value of a performance score and a reach score, in accordance with the first exemplary embodiment of the present disclosure.

FIGS. 5 and 6 are diagrams illustrating examples of other athlete scores for an athlete who belongs to an H1 hierarchy, and an athlete who belongs to an H3 hierarchy, respectively.

Referring to FIG. 5, an athlete score for a different athlete such as Scott Tilton may have a different value. In this example, the athlete value for Scott Tilton is 489.79 which is less than the value of the athlete discussed with reference to FIG. 4. Accordingly, the athlete of FIG. 5 may be in a lower hierarchal group, H1, than the athlete of FIG. 4 who is in the group H2.

Referring to FIG. 6, an athlete score for another athlete such as Ken Roczen may have a different value. In this example, the athlete value for Ken Roczen is 8,643.04 which is greater than the value of the athletes discussed with reference to FIGS. 4 and 5. Accordingly, the athlete of FIG. 6 may be in a higher hierarchal group, H3, than the athletes of FIGS. 4 and 5 who are in the groups H2 and H1, respectively. For example, an athlete score ranging from 1 to 4,999 may place an athlete within the group H1, an athlete score ranging from 3,000 to 6,999 may place an athlete within the group H2, and an athlete score ranging from 5,000 to 10,000 may place an athlete within the group H3. It should be appreciated that any number of hierarchical groups and any range of athlete score values may be used for separating athletes into groups based on their athlete score.

Referring to FIGS. 4-6, the athlete value for an athlete within each of the groups H1, H2, or H3 may be calculated differently. For example, the weights for each of the commitment value, the performance value, and the reach value may be different for calculating the athlete score for athletes within different hierarchal groups. In the example shown in FIG. 4, for an athlete in the group H2, the commitment value may be weighted at 20%, and the performance and reach values may each be weighted at 40%. In the example shown in FIG. 5, for an athlete in the group H1, the commitment value may be weighted at 35%, the performance value may be weighted at 35%, and the reach value may be weighted at 30%. In the example shown in FIG. 6, for an athlete in the group H3, the performance value may be weighted at 50% and the reach value may be weighted at 50%.

Accordingly, one or more of the commitment value, performance value, and reach value may be omitted for athlete score calculations within certain groups. For example, the athlete scores for athletes within the highest group, H3, may be calculated without consideration for the commitment value because such athletes have already demonstrated their commitment to the sport. Also, the commitment value may have a smaller impact on the athlete score as an athlete score becomes greater and the athlete moves from a lower hierarchal group to a higher hierarchal group. That is, because an athlete has demonstrated their commitment to the sport, the commitment value becomes less pertinent to the athlete's overall value.

Further, factors discussed above that are used for calculating each of the commitment, performance, or reach values may be different for each of the hierarchal groups. For example, one or more of the factors considered for calculating the commitment score, one or more of the factors considered for calculating the performance score, or one or more of the factors considered for calculating the reach score may be different from one hierarchal group to another hierarchal group.

Figure 7:
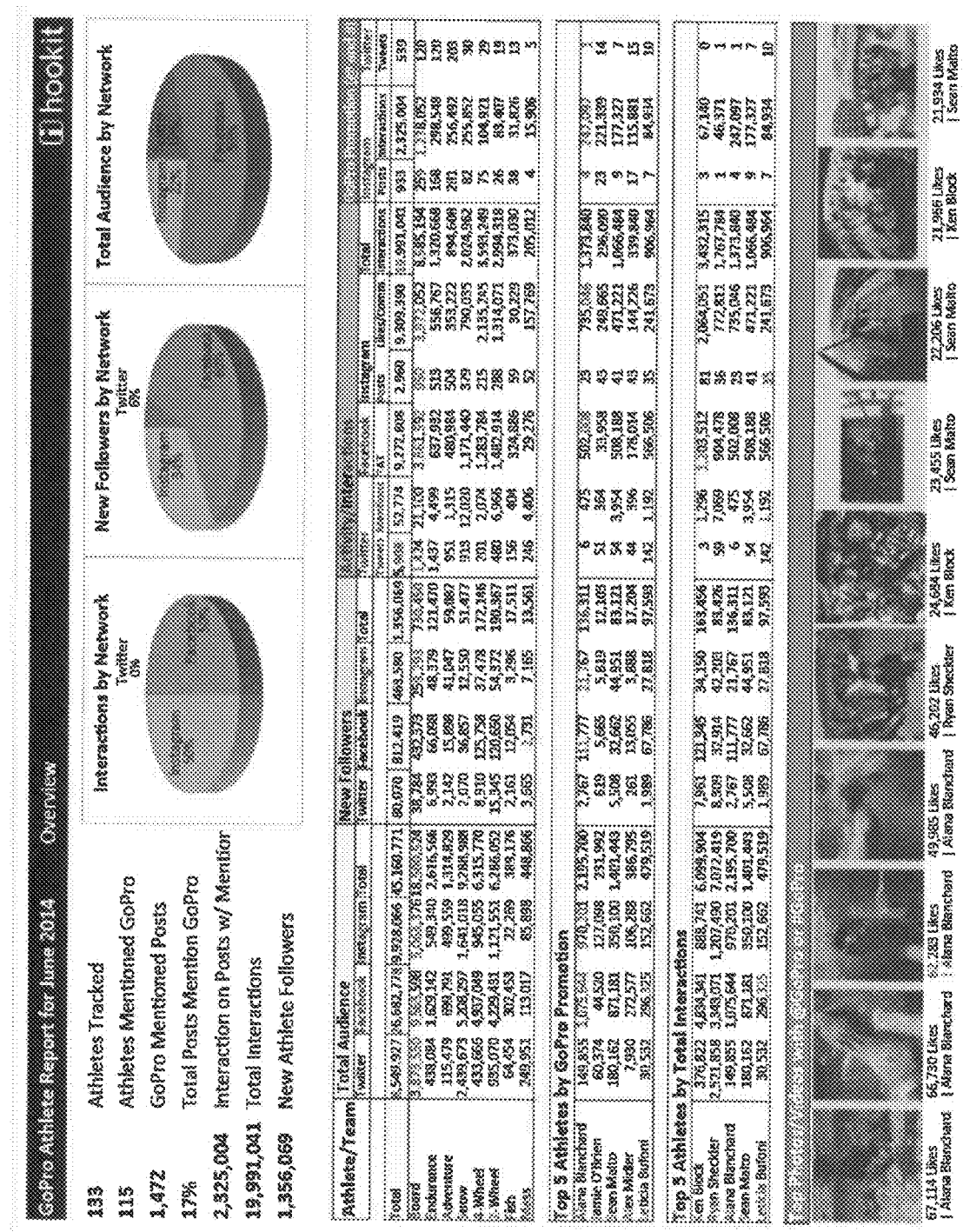
FIG. 7 is a diagram illustrating an example of an athlete report that may be provided to a specific company such as GoPro® and monitors a general value or a brand-specific value of one or more athletes, in accordance with the first exemplary embodiment of the present disclosure.

FIG. 7 is a diagram illustrating an example of an athlete report that may be provided to a specific company such as GoPro® and monitors a general value or a brand-specific value of one or more athletes.

Referring to FIG. 7, a number of athletes may be tracked over a period time for purposes of monitoring their general value or their value with respect to the marketability of a specific company, product, or brand. In this example, 133 athletes are tracked over a period of a month. The athlete report may provide data on the marketability of the tracked athletes based on data obtained from social media platforms. Additionally, an athlete report may incorporate data obtained on athletes such as the athlete score described above with reference to FIGS. 4-6.

For example, an athlete report includes information on the number of athletes tracked, the number of athletes who mentioned a specific company or brand such as GoPRO® on a social media platform, the number of posts or comments including a mention of the company, the percentage of posts or comments for all athletes or for each athlete that mentions the specific company, the number of interactions on posts or comments which include a mention of the company, the total number of interactions on a social media platform, and the number of new followers for an athlete. Additionally, charts and tables may be provided for easily displaying such information on the athlete report. For example, the number of interactions by network, the number of new followers by network, or the total audience by network may be illustrated.

Additionally, social media data may be separated according to sport and athlete to determine which sports or athletes are most valuable for marketing a particular brand or product, or for general marketing purposes. For example, a table may include the total number of audience members for each sport or athlete on each social media platform, a total number of new followers for each sport or athlete on each social media platform, the amount of activity and interactions for each sport or athlete on each social media platform, and the number of mentions or promotions of a particular brand or company, such as GoPro®, on each social media platform. Accordingly, all sports and athletes may be ranked based on any one or more of the data values obtained for monitoring the marketability of the sports or the athletes. For example, the top five athletes may be ranked according to their promotion of a brand or company, such as GoPro®, or the top five athletes may be ranked according to the number of total interactions to determine their general marketability. Also, the top photos or videos which are shared and include a promotion of a particular brand or company, such as GoPro®, may be identified and displayed on the athlete report.

As illustrated in FIG. 7, the total interactions, whether by athlete or with respect to a general sport, may be based on an athlete's activity or other users' activities relating to the athlete's activity on one or more social media platforms. For example, the total interactions may be calculated based on one or more of the number of tweets on Twitter, the number of mentions on Twitter, the athlete's Facebook page TAT (talking about this) number, and the number of Instagram likes or comments. Additionally, the number of promotions of a brand or company may be monitored by providing the number of Instagram or Twitter posts that tag the name of the brand, for example @GoPro or #GoPro, and the number of interactions by users on such posts.

Figure 8:
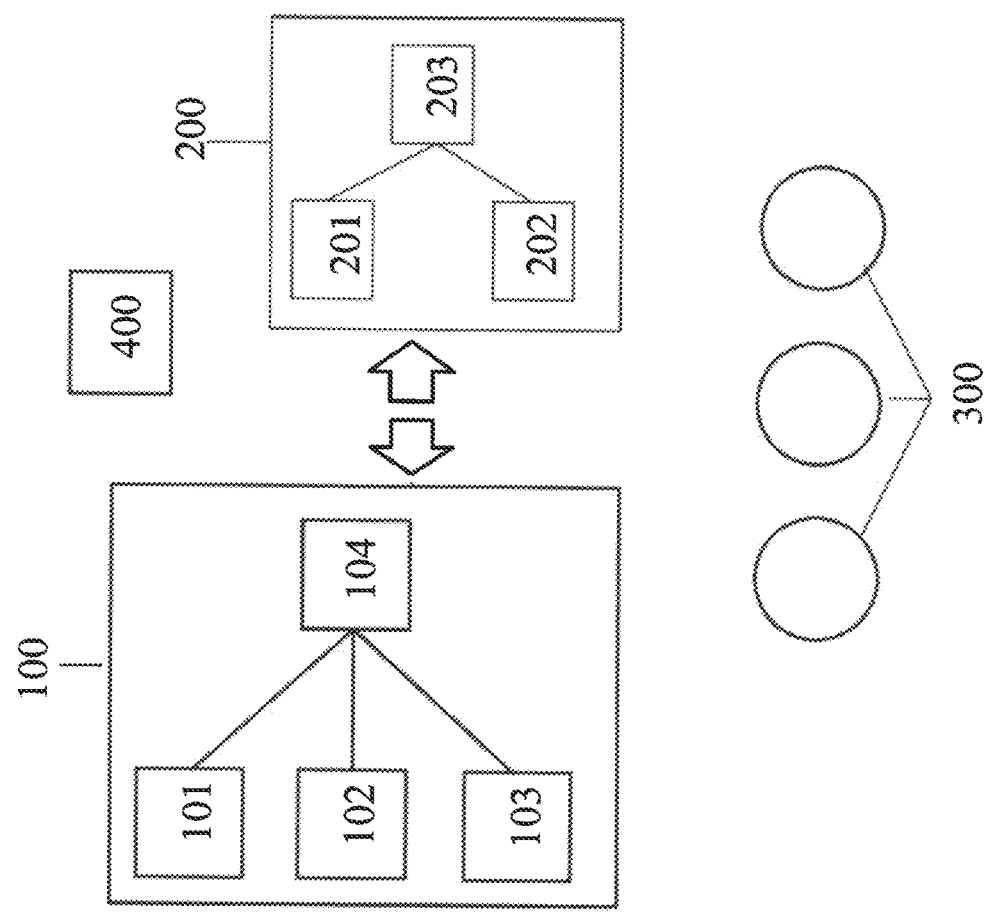
FIG. 8 is a diagram illustrating an example of an athlete monitoring system including an athlete score generating device and an athlete report generating device, in accordance with the first exemplary embodiment of the present disclosure.

FIG. 8 is a diagram illustrating an example of an athlete monitoring system including an athlete score generating device 100, an athlete report generating device 200, one or more virtual networking platforms, e.g., social media platforms 24, and an athlete interface 400. An athlete score generating device 100 includes a performance score unit 101, a commitment score unit 102, a reach score unit 103, and an athlete score generating unit 104. The performance score unit 101, commitment score unit 102, and reach score unit 103 calculate a commitment score, a performance score, and a reach score according to the description provided above with reference to FIGS. 4-6. Accordingly, each of the commitment score, performance score, and reach score may be used by the athlete score generating unit 104 to generate the athlete score.

The athlete monitoring system may also include an athlete report generating device 200. The athlete report generating device 200 includes an athlete monitoring unit 201, a sport monitoring unit 202, and an athlete report generating unit 203. The athlete monitoring unit 201 and the sport monitoring unit 202 may monitor the social media activities related to an athlete or a sport according to the description provided above with reference to FIG. 7. Accordingly, the athlete report generating unit 203 may generate an athlete report based on the data provided by the athlete monitoring unit 201 and the sport monitoring unit 202.

The athlete score generating device 100 and the athlete report generating device 200 may communicate with one or more social media platforms 24. The athlete score generating device 100 and the athlete report generating device 200 may be wirelessly connected to one or more of the social media platforms 24 to automatically or manually receive social media data. For example, social media information may be used by the reach score unit 103 to calculate an athlete's reach score or used by the athlete monitoring unit 201 to monitor an athlete's social media activities. Also, an athlete score or an athlete report may be sent to or published on a social media platform.

The athlete score generating device 100 and the athlete report generating device 200 may also communicate with one or more athlete interface units 400. The athlete score generating device 100 and the athlete report generating device 200 may be wirelessly connected to one or more of the athlete interface units 400 to automatically or manually receive data inputs from athletes. For example, an athlete may share how active they are in their sport. Every time an athlete practices or participates in a competition, the athlete may post a session from an athlete interface unit 400 to get full credit applied to their athlete score. Also, athletes may receive athlete score information or athlete reports for tracking and challenging their own progression, or comparing their efforts by monitoring other athletes. Similar interfaces (not shown) may be included in the athlete monitoring system for use by companies, promoter, fans, or media critics for receiving athlete scores or athlete reports from the athlete score generating device 100 and the athlete report generating device 200.

Additionally, the athlete score generating device 100 and the athlete report generating device 200 may communicate with each other for generating an athlete score or an athlete report. For example, the athlete report generating device 200 may use the athlete score generated by the athlete score generating device 100 to generate the athlete report. Also, the athlete score generating device 100 may use data obtained by the athlete report generating device 200 to generate the athlete score.

Figure 9:
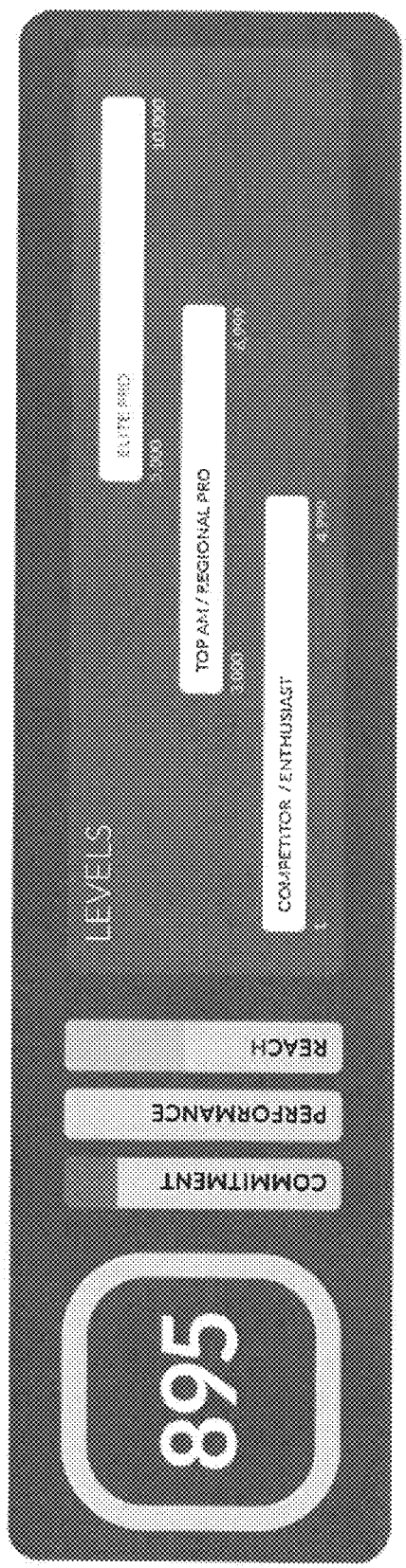
FIG. 9 is a diagram illustrating an example of a user interface display that includes a total athlete score and an indicator for each weighted score that forms the total athlete score, such as a commitment score, a performance score, and a reach score, in accordance with the first exemplary embodiment of the present disclosure.

FIG. 9 is a diagram illustrating an example of a user interface display that includes a total athlete score and an indicator for each weighted score that forms the total athlete score, such as a commitment score, a performance score, and a reach score. As illustrated in FIG. 9, the total athlete score may be displayed in large font and highlighted for the athlete. In this example, the athlete score is 895. Also, the level of commitment, performance, and reach values may be represented on bar graphs or other types of graphs for identifying the magnitude of each factor. Additionally, other scores may be displayed for helping an athlete identify the hierarchal levels for all athletes using the athlete score.

It should be appreciated that the described athlete score may be used in connection with any number of different sport or related activities. That is, the athlete score is not limited to any particular sport, but can be used with any and all sports and athletic activities. Further, while the athlete score is described as a weighted score based on a commitment, performance, and/or reach value, it should be appreciated that the athlete score can be based on only one of these values or any combination of these values. Accordingly, the athlete score is not limited to a weighted score based on commitment, performance, and reach.

Figure 10:
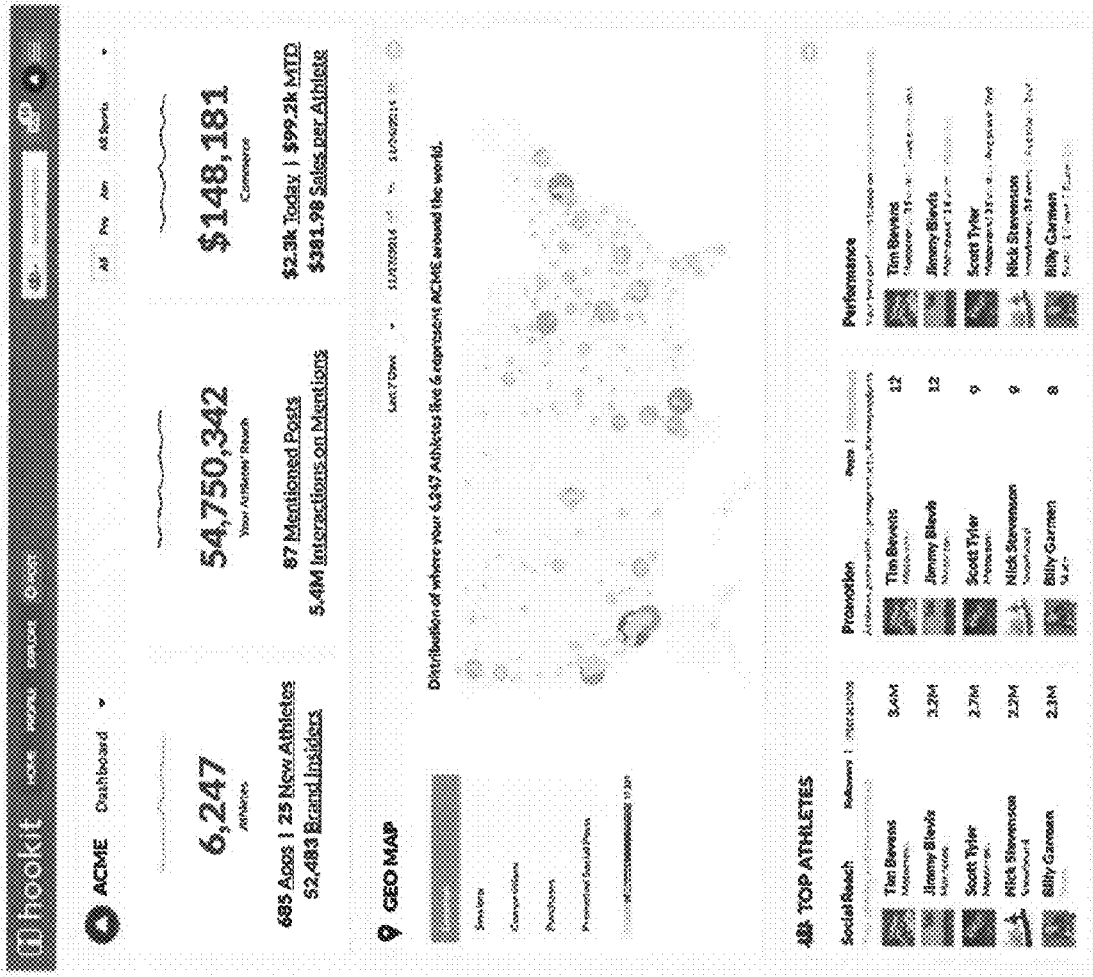
FIG. 10 is a diagram illustrating an example of a dashboard for monitoring and/or ranking athlete activity including key metrics, an athlete map, and a ranking of top athletes, in accordance with the first exemplary embodiment of the present disclosure.
Figure 11:
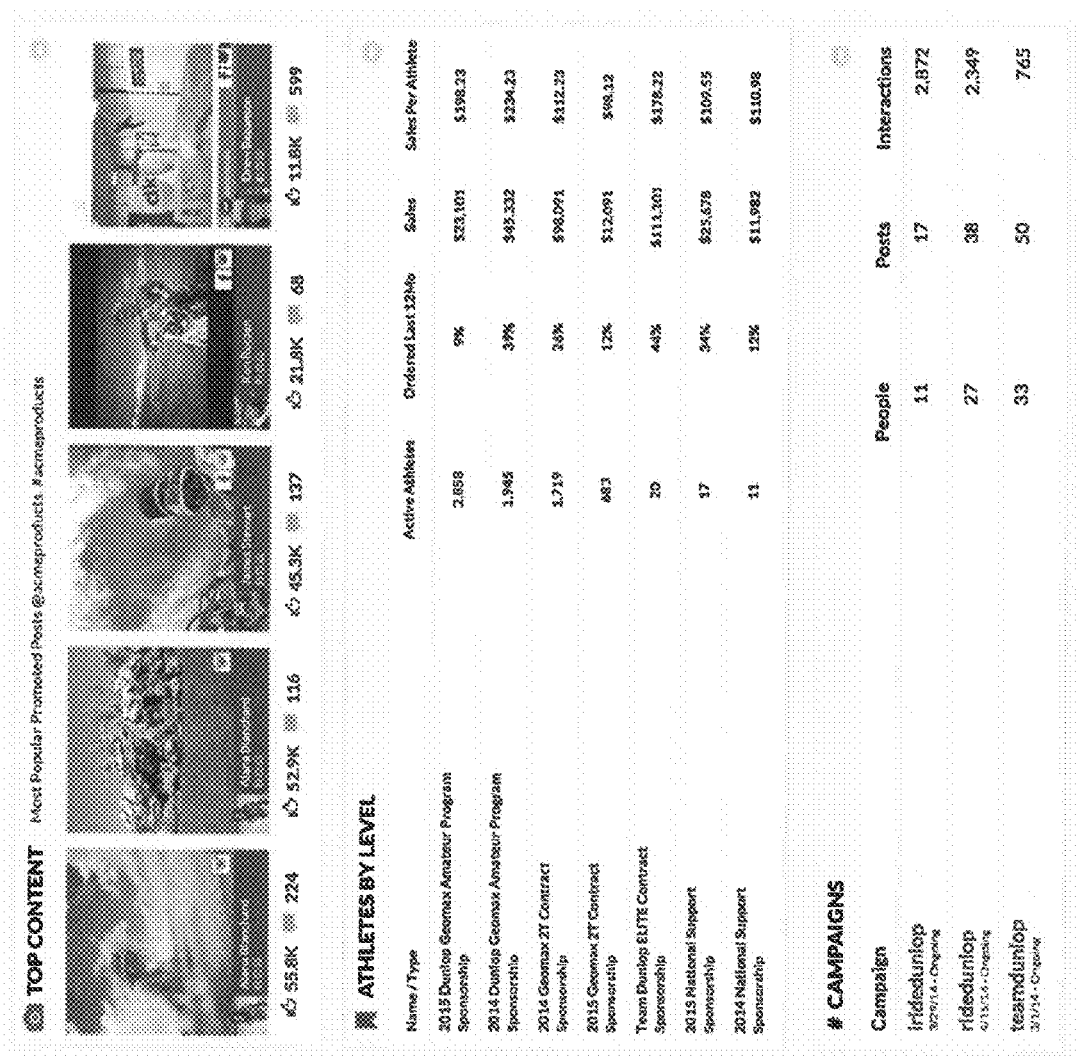
FIG. 11 is a diagram illustrating an example of a dashboard for monitoring and/or ranking athlete activity including top social media content, athlete metrics by level, and hashtag campaign metrics, in accordance with the first exemplary embodiment of the present disclosure.

FIGS. 10 and 11 are diagrams illustrating an example of a dashboard for monitoring athlete activity including key metrics, an athlete map, a ranking of athletes, top social media content, athlete metrics by level, and hashtag campaign metrics. This dashboard may be used by a brand or a company for monitoring and ranking an athlete or a group of athletes. The athlete ranking and information may be updated every predetermined period of time, for example, every hour or other period of time to provide real-time monitoring.

Referring to FIG. 10, the dashboard includes key metrics such as the number of athletes enrolled in a program, the number of applications from athletes seeking enrollment, the number of new or recently enrolled athletes, and the number of brand insiders. The dashboard may also include information on social impact and exposure of athletes, and sales information per day, per year, and per month. Additionally, the dashboard may include an athlete map that displays the location of where athletes live, compete, mention the brand, post social media content, participate in social media activities, or buy the company's product. Athletes may be ranked and top athletes may be identified and listed on the dashboard; for example, top athletes may be identified according to the different embodiments of the athlete score or other information such as which athletes are performing the best or promoting the brand the best. Also, athletes can be ranked by most followers on social media, highest engagement percentage, and athletes with the best most recent results according to a period of time.

Referring to FIG. 11, the dashboard also includes information on athletes by level, top content, and hashtag campaigns. Athletes, and information on athletes, may be divided according to level of athlete from amateur to professional. Top athletes in each category may be ranked and displayed. Top content may be identified as popular posts from the athletes promoting the company brand in social media, and may be displayed on the dashboard. In this example, hashtag campaigns are tracked to identify all hashtags relating to the company or brand. Further, any hashtag used by athletes may be tracked or monitored and can be identified and displayed. For each displayed hashtag, the number of people, posts, and interaction may also be identified and displayed.

Figure 12:
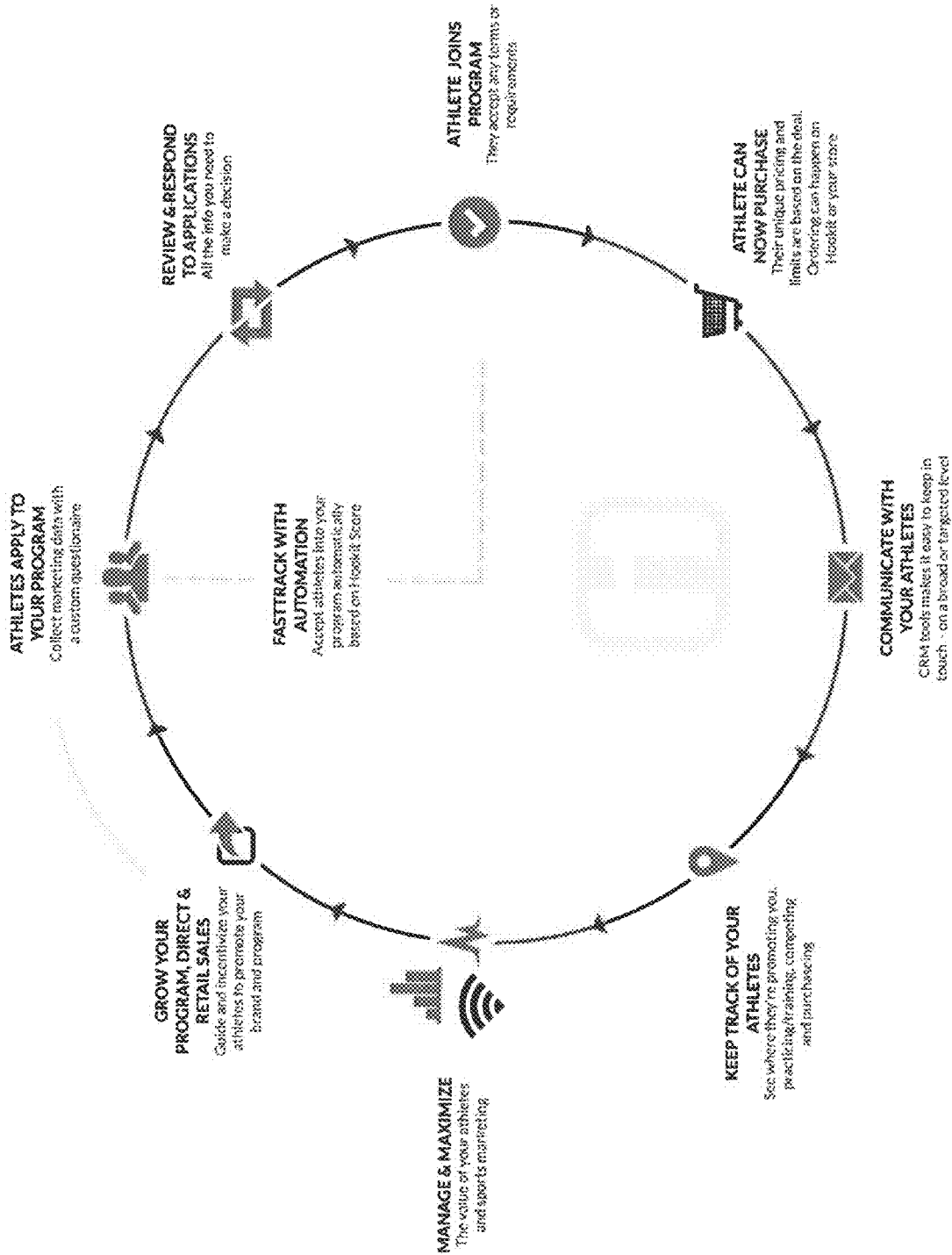
FIG. 12 is a diagram illustrating an example of a method for promoting a brand based on an athlete score or other athlete related metrics and/or rankings, in accordance with the first exemplary embodiment of the present disclosure.

FIG. 12 is a diagram illustrating an example of a method for promoting a brand based on an athlete score or other athlete related metrics. An athlete may apply to a company's marketing program using a questionnaire relating to marketing data, the company may review and extend an invitation to the athlete based on the merits of the athlete's application, and the athlete may join the company's program and accept the terms of joining the program. Additionally, the company may accept athletes automatically based on an athlete's score, as described in the examples provided above on athlete scoring systems.

Once the athlete enrolls in a company's program, the athlete becomes eligible for unique pricing and offers for purchasing merchandise, the company can communicate directly with the athlete, and the company may monitor promoting and other activity of the athlete, as described above in reference to FIGS. 10 and 11. Using data provided from monitoring athletes enrolled in the company's program, the company may manage and maximize the value of athletes and sports marketing. For example, monitoring the most valuable athletes or sport markets allows the company to incentivize these athletes to further promote the product. Accordingly, the company will continue to grow the program and increase sales of merchandise based on promoting activities of athletes enrolled in the company program.

Figure 13:
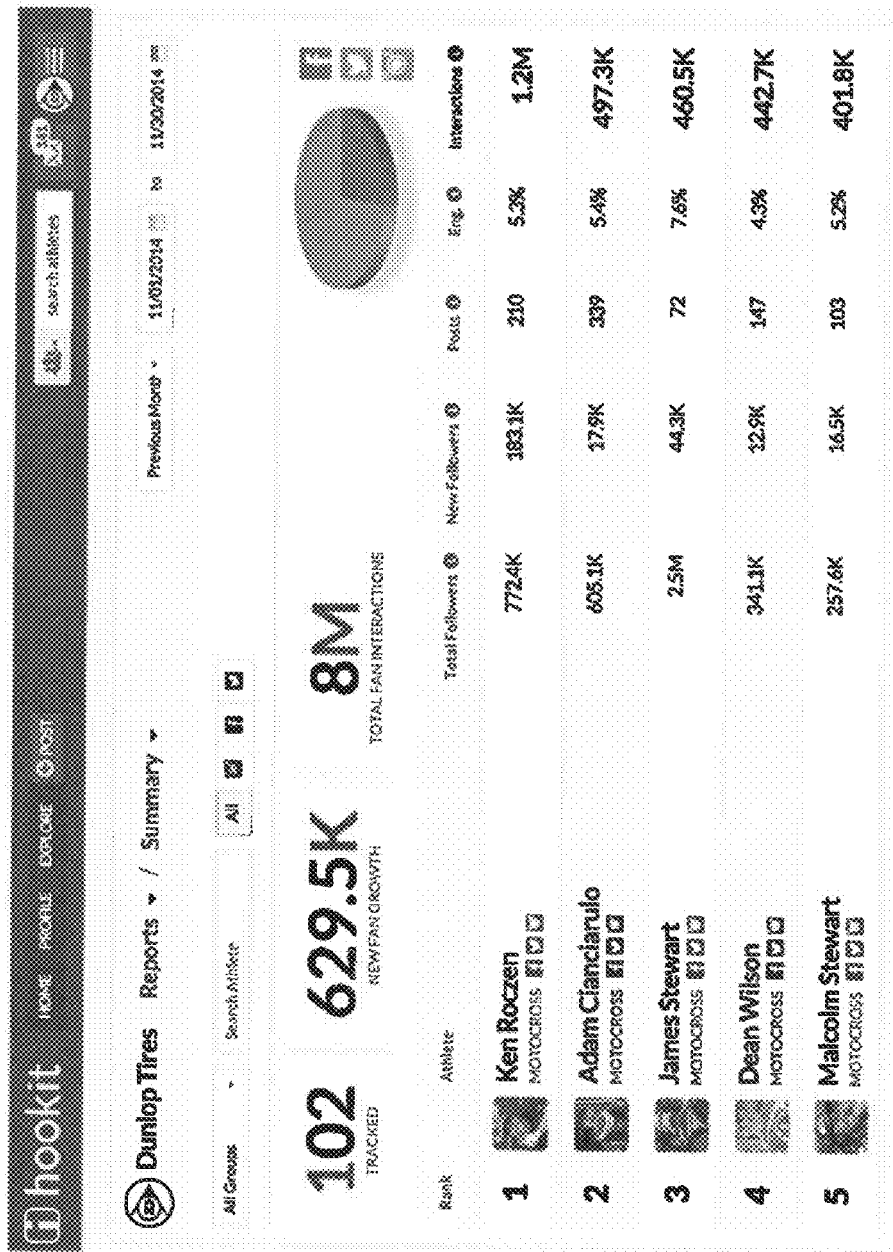
FIG. 13 is a diagram illustrating an example of a report including a summary that may be provided to a specific company such as Dunlop® and monitors and/or ranks the interactions of one or more athletes, in accordance with the first exemplary embodiment of the present disclosure.
Figure 14:
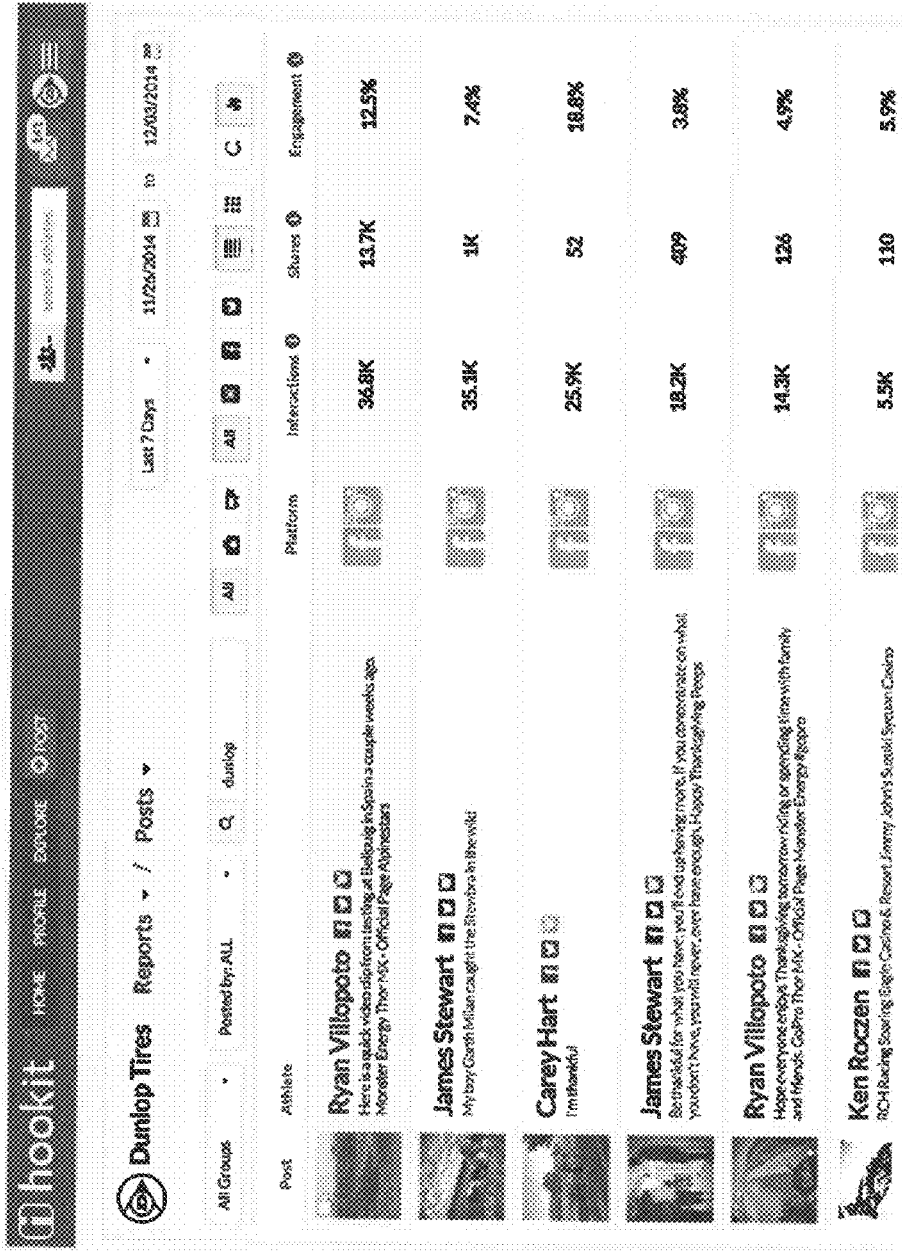
FIG. 14 is a diagram illustrating an example of a report including posts that may be provided to a specific company such as Dunlop® and monitors and/or ranks the interactions of or with one or more athletes, in accordance with the first exemplary embodiment of the present disclosure.
Figure 15:
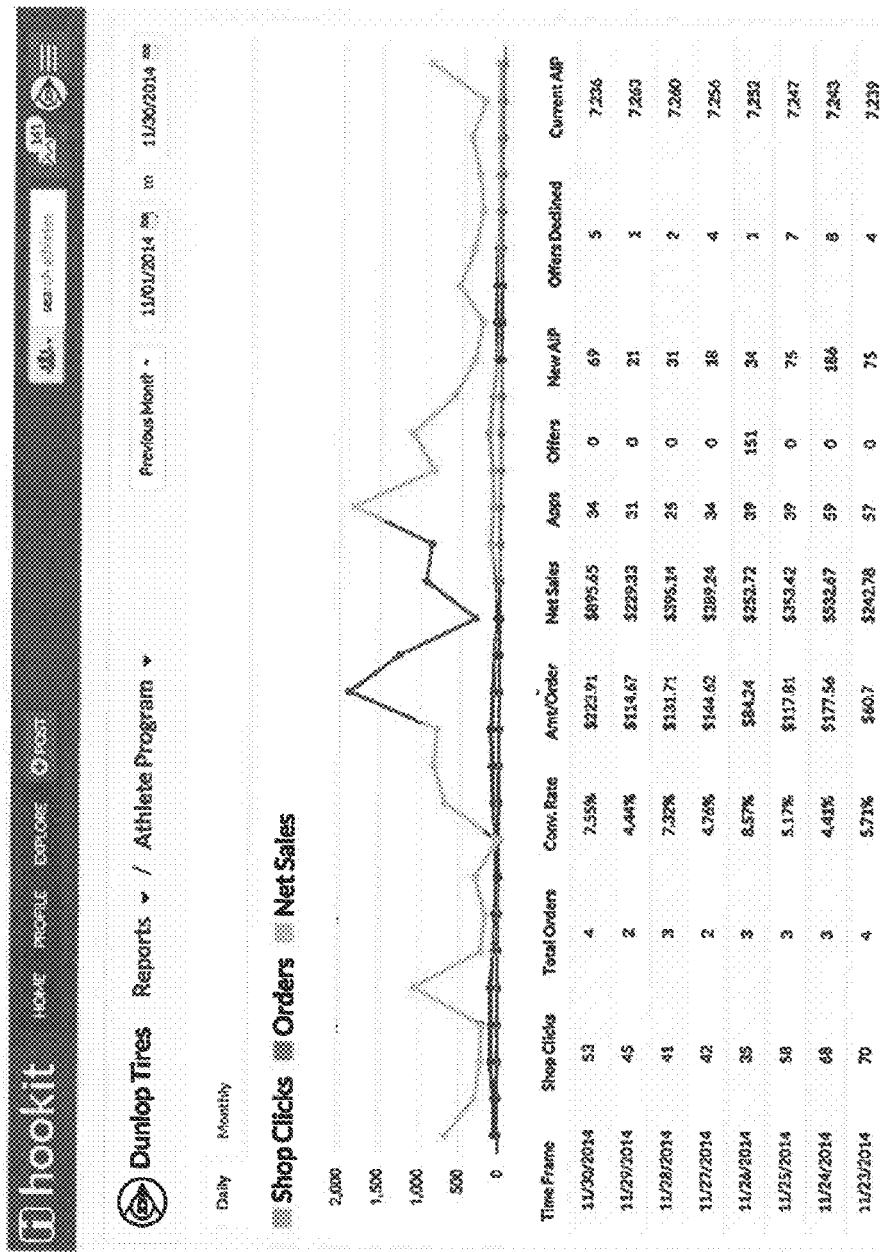
FIG. 15 is a diagram illustrating an example of a report including sales information that may be provided to a specific company such as Dunlop® and monitors and/or ranks the interactions of or with one or more athletes, in accordance with the first exemplary embodiment of the present disclosure.

FIGS. 13-15 are diagrams illustrating an example of reports that may be provided to a specific company for monitoring the interactions of one or more athletes.

Referring to FIG. 13, an example of a report includes a summary that may be provided to a specific company such as Dunlop® and monitors the interactions of one or more athletes. The summary report includes information on how many athletes are tracked, the number of new or recent fan growth, and the total fan interaction with the tracked athletes. Further, athletes may be ranked by total followers, new followers, number of posts, engagement percentage, and/or number of social media interactions. In this example, the athletes are ranked by the number of total social media interactions. Additionally, athletes may be ranked according to sport or all athletes may be ranked together, and data may be grouped according to all social media platforms or according to a specific social media platform.

Referring to FIG. 14, an example of a report includes ranking of athletes' posts that may be provided to a specific company such as Dunlop® and monitors the interactions of one or more athletes. Athlete posts may be ranked according to total number of social media interactions, number of shares, or engagement percentage with the post. In this example, the posts are ranked by the total number of social media interactions. Additionally, as with the summary report, posts may be filtered according to a specific sport, and data may be grouped according to all social media platforms or according to a specific social media platform. Also, posts may be filtered according to type for distinguishing between posted pictures and videos.

Referring to FIG. 15, an example of a report includes sales information that may be provided to a specific company such as Dunlop® and monitors the interactions of one or more athletes. The number of shop clicks, total orders, and net sales may be monitored and recorded. This report can be provided for a predetermined period of time, and more specific information can be provided for a smaller period of time within the predetermined period of time. In this example, the report is provided for November 2015 and specific information is provided for each day within the month of November. Specific information may include information on shop clicks, total orders, conversion rates, amount per order, net sales, applications, offers, new AIP, offers declined, and current AIP. Data can be provided on a graph including information on shop clicks, orders, and net sales, or other data.

Figure 16:
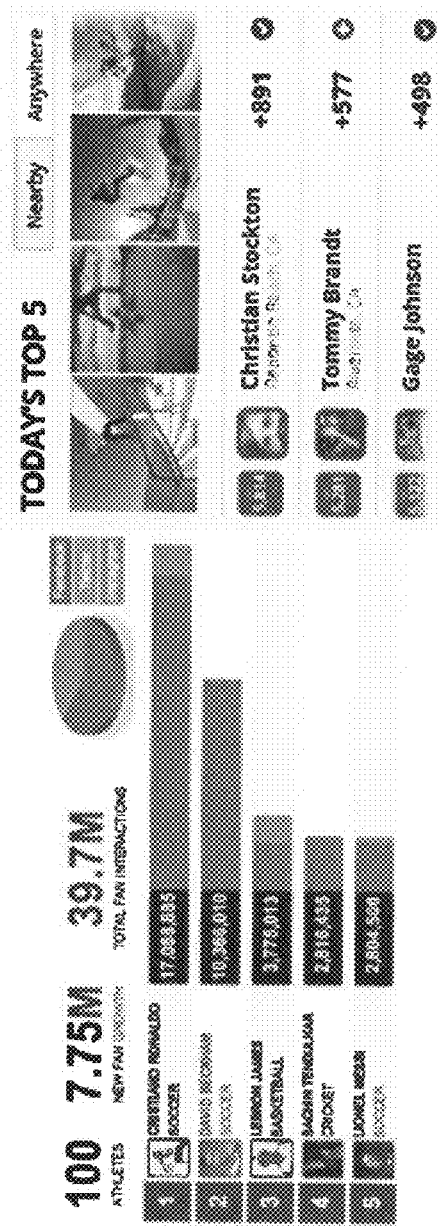
FIG. 16 is a diagram illustrating an example of athlete ranking based on social interactions, in accordance with the first exemplary embodiment of the present disclosure.

FIG. 16 is a diagram illustrating an example of athlete ranking. Athletes may be ranked according to any number of data points; for example, performance, commitment, social reach, a weighted athlete score as described above, or components of such data points. In this example, athletes are ranked according to the number of fans and/or followers on social media platforms such as Facebook, Twitter, and Instagram. For example, the top 100 athletes for a particular sport or the top 100 athletes overall may be identified and ranked according to total fans and/or followers, and new fan growth and total fan interactions for the top 100 athletes may be displayed. Further, the top five athletes having the greatest number of new fans and/or followers over a predetermined period of time may be ranked and displayed. In this example, the top five athletes in a nearby location and having the greatest number of new fans and/or followers over the past day are ranked and displayed. Also, the top five athletes in any location over the past day may be ranked and displayed. Accordingly, in an aspect, athletes are ranked overall and by sport every month based on their social interactions and follower growth.

Figure 17:
FIG. 17 is a diagram illustrating an example of an engagement or interaction ranking and live stream during an event, in accordance with the first exemplary embodiment of the present disclosure.

FIG. 17 is a diagram illustrating an example of an engagement ranking and live stream during an event. Athletes participating at an event are ranked in several ways: by total social interactions, new followers, and total followers. Athletes are also ranked by their best individual posts based on interactions or engagement percentage.

Referring to FIG. 17, an engagement leaderboard during the event displays the athletes or the posts having the highest engagement percentage including a copy of the post, the number of likes, the number of comments, the name of the athlete, and the engagement percentage for each post. A predetermined number of athletes or posts are ranked; for example, the top 100 posts or the top 100 athletes, or all athletes participating in the event are ranked.

Figure 18:
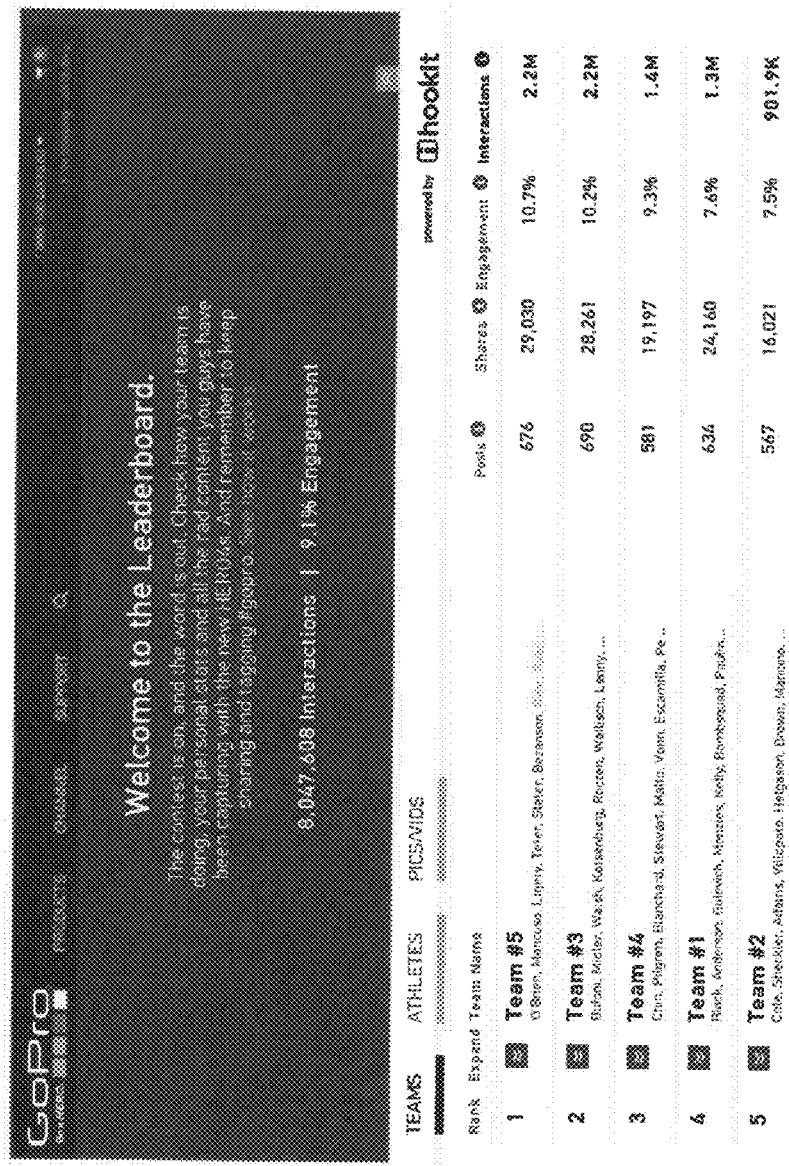
FIG. 18 is a diagram illustrating an example of an engagement or interaction ranking based on the social activities of one or more persons grouped in a team, in accordance with the first exemplary embodiment of the present disclosure.

FIG. 18 is a diagram illustrating an example of ranking teams including one or more users and/or athletes. For example, each team includes a group of users and the collective user activity for each team is used for ranking purposes. In this example, the teams are ranked according to the number of interactions; however, teams may also be ranked by engagement percentage, number of shares, and number of posts. The total number of interactions and engagement percentage during an event or contest may also be monitored and displayed.

Figure 19:
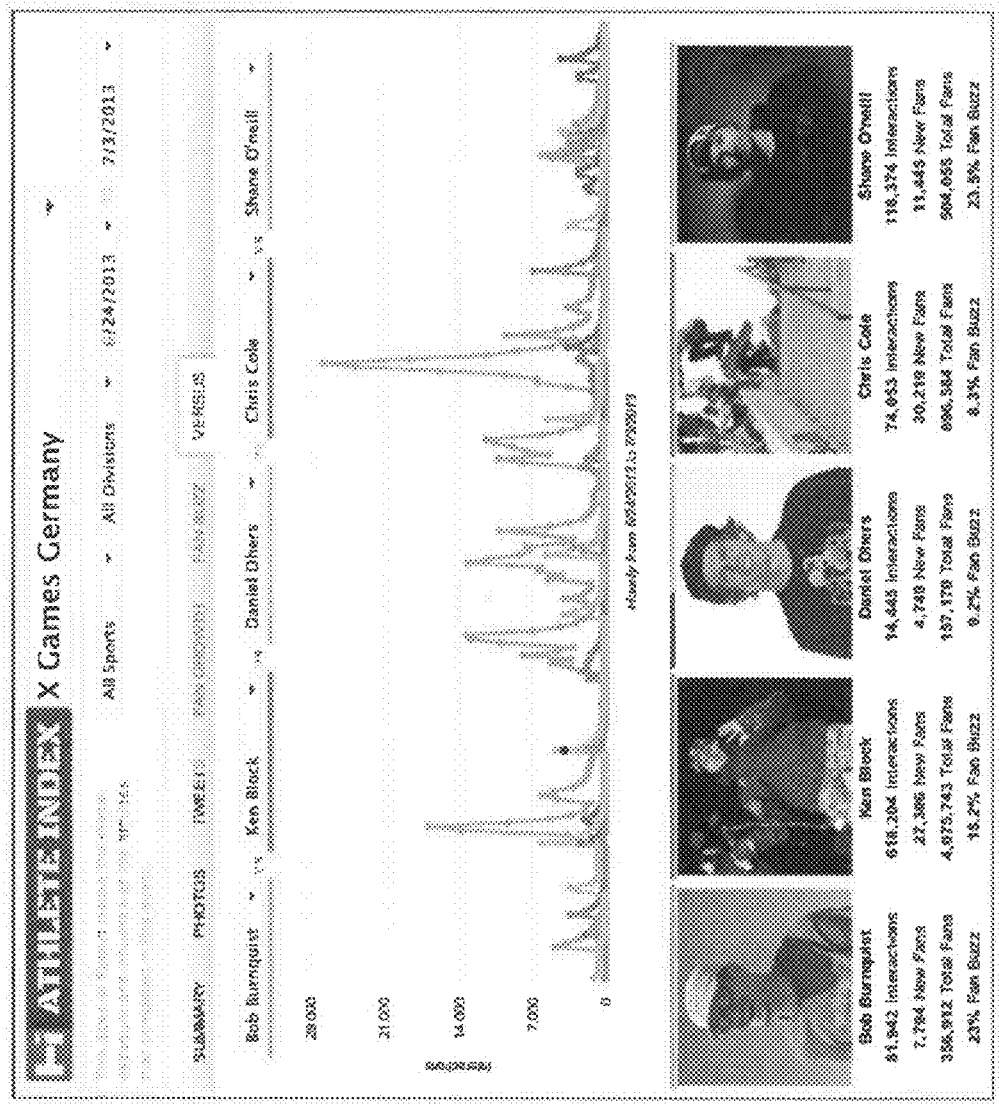
FIG. 19 is a diagram illustrating an example of a chart monitoring and/or comparing the interactions of one or more athletes during an event, in accordance with the first exemplary embodiment of the present disclosure.
Figure 20:
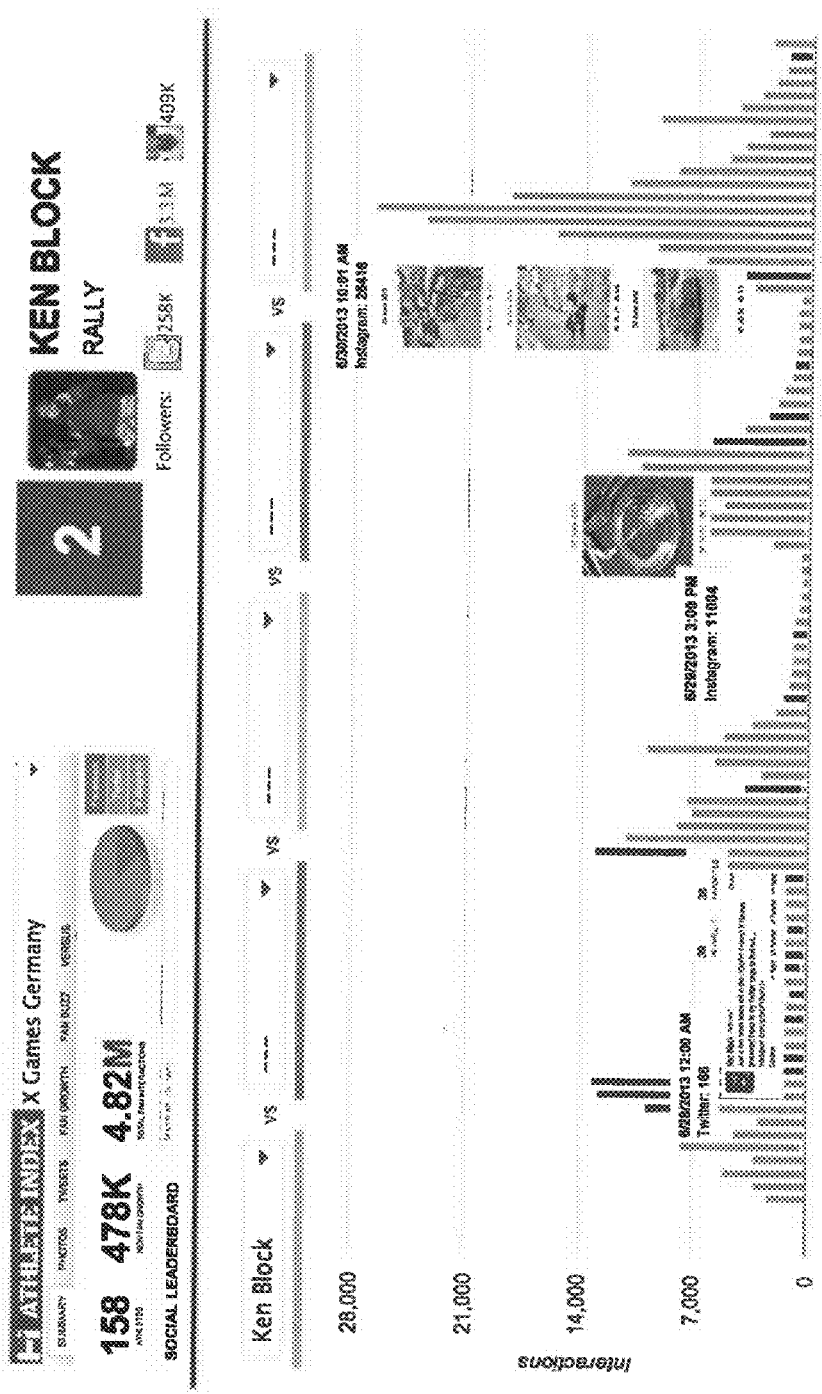
FIG. 20 is a diagram illustrating an example of a chart monitoring and/or comparing the interactions of one or more athletes during an event, in accordance with the first exemplary embodiment of the present disclosure.

FIGS. 19 and 20 are diagrams illustrating examples of a chart monitoring the interactions of one or more athletes during an event. Referring to FIG. 19, the one or more athletes are compared by hourly interactions over a predetermined period of time; for example, five athletes are compared over a period of two weeks or one month. The number of hourly interactions for each athlete may be graphed on a line chart and data for each athlete may be displayed by total number of interactions, new fans, total fans, and fan buzz percentages. Referring to FIG. 20, the activity of one or more athletes is illustrated on a bar graph where the number of hourly interactions over a predetermined period of time is monitored and displayed. For example, the number of interactions per hour is displayed and the posts generating interactions are also displayed on the bar graph. Even though only one athlete's activity is illustrated on the bar graph, the activity of more than one athlete may be compared in the bar graph as with the line graph.

In another example, athletes may be ranked at a particular spot or venue to generate "spot" ranking. Similar to event rankings, athletes that participate at a particular venue (i.e. motocross track, skate park, basketball court, race track, golf course, etc.) are ranked. Athletes that have recently participated at the spot are ranked by their total impact score or other component scores. Photos and videos posted are ranked by their total interactions or engagement percentage. Spots, such as a skate park or stadium may have TV's displaying the rankings and live stream of the photo/video leaderboard. Also, live broadcasts of events or at a particular venue may reference ranking information or athlete score information that is generated by an athlete scoring and/or athlete ranking system.

Figure 21:
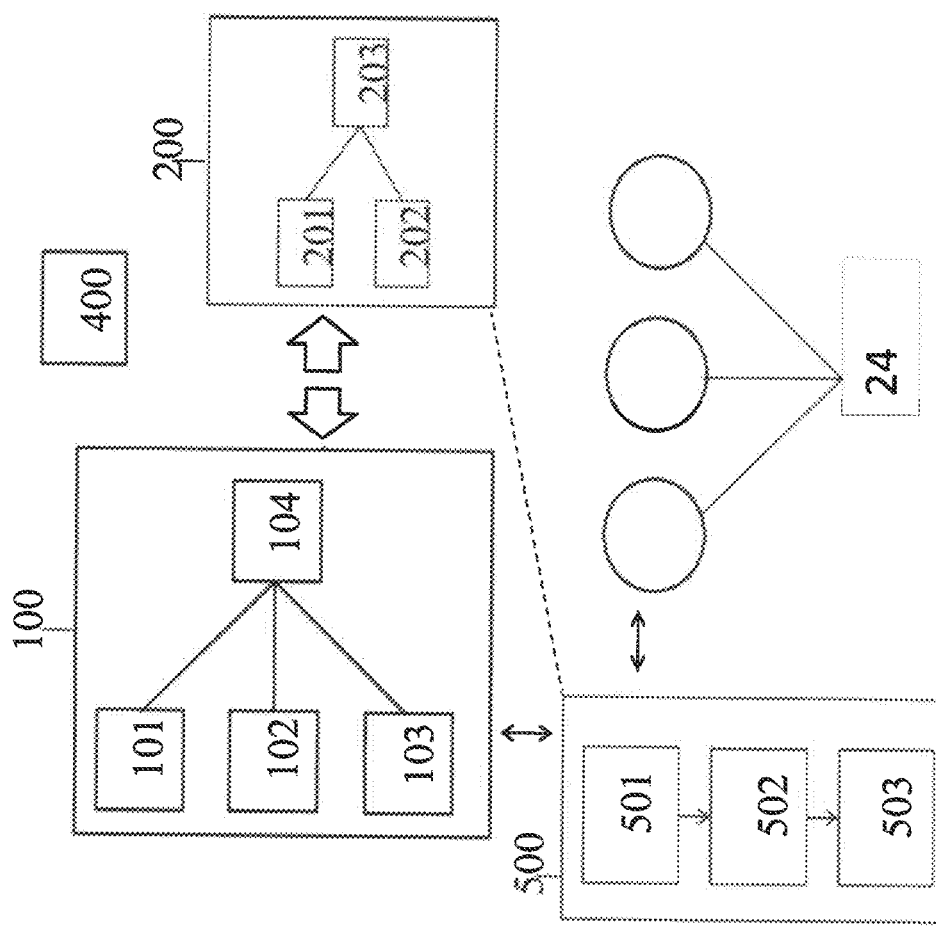
FIG. 21 is a diagram illustrating an example of an athlete monitoring system including an athlete score generating device, an athlete report generating device, and an athlete rank generating device, in accordance with the first exemplary embodiment of the present disclosure.

FIG. 21 is a diagram illustrating an example of an athlete monitoring system. As described above with reference to FIGS. 1, 2, and 8, an athlete monitoring system may include an athlete score generating device 100, an athlete report generating device 200, one or more social media platforms 24, and an athlete interface 400. These devices and/or interfaces are described above with reference to FIG. 8, of which description is also applicable with reference to FIG. 21.

Referring to FIG. 21, an athlete monitoring system may also include an athlete rank generating device 500. An athlete rank generating device 500 may include a data receiving unit 501, an athlete ranking unit 502, and an athlete rank generating unit 503. The data receiving unit 501 may receive data on athletes' social media activity from the one or more social media platforms 24 and/or information on athlete scores from the athlete score generating device 100. The data receiving unit 501 may transmit this data to the athlete ranking unit 502 which may process the data and transmit the processed data to an athlete rank generating unit 503. The athlete rank generating unit 503 may generate a ranking of athletes according to several different examples described above such as by social media activity, an athlete score, components of an athlete score, among other rankings.

The athlete rank generating unit 503 may directly generate a ranking report that may be used in a variety of different applications such as company dashboards, company reports, live TV broadcasts, top 100 or top five athlete reports, online live stream and leaderboard reports for an event or at a particular spot or venue, team contests, athlete comparison reports, among other applications. It should be appreciated that the athlete rank generating device 500 may communicate with the report generating device 200 to generate any of the described reports, or may be integral with the report generating device as a combined report and rank generating device.

It should be appreciated that the athlete scoring and ranking system 14, the athlete score generating device 100, the athlete report generating device 200, the athlete rank generating device 500, and other units or modules, are configured to perform athlete scoring, monitoring, or ranking for large groups of user or athletes. Further, the resulting output information is configured to be provided to a large number of potential users including social media followers, fans, companies, and other users. Accordingly, a large quantity of input data is received and processed for performing the described scoring, monitoring, and ranking operations. Further, data processing for the above described devices, modules, and systems requires an exponential number of operations that are a function of multiple data inputs relating to more than one athlete. That is, athlete scoring, monitoring, and ranking processes are a function of input data provided by many athletes where the number of operations required to perform such processes increases non-linearly with an increase in the number of athletes considered.

It should be understood that similar to the other processing flows described herein, the steps and the order of the steps in the flowchart described herein may be altered, modified, removed and/or augmented and still achieve the desired outcome. A multiprocessing or multitasking environment could allow two or more steps to be executed concurrently.

While examples have been used to disclose the invention, including the best mode, and also to enable any person skilled in the art to make and use the invention, the patentable scope of the invention is defined by claims, and may include other examples that occur to those of ordinary skill in the art. Accordingly the examples disclosed herein are to be considered non-limiting. As an illustration, an athlete score and/or a ranking of athletes may be generated using a number of different factors or based on a single factor.

It is further noted that the systems and methods may be implemented on various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein. For example, a computer can be programmed with instructions to perform the various steps of the flowchart shown in FIGS. 3 and 12.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A system for analyzing and quantifying an impact of a presence of an entity within a virtual networking environment, the system comprising:
    at least one virtual networking platform having at least one account associated with the entity;
    an application programming interface (API) providing a data feed from the at least one account from the at least one virtual networking platform, wherein the data feed is provided in responses to requests, and wherein the API has a rate limit for a number of requests in a period of time, wherein the rate limit is authenticated by tokens;
    a server having a processor in communication with the API to receive the data feed from the at least one virtual networking platform and extract a plurality of factors at least partially from the data feed, wherein the plurality of factors are quantified with a plurality of calculators comprising:
    a commitment score calculator extracting commitment factors at least partially from the data feed to derive a commitment score based on a weighted sum of the commitment factors, wherein the commitment factors include a time period of activity of the entity on the at least one virtual networking platform;

a performance score calculator extracting performance factors at least partially from the data feed to derive a performance score based on a weighted sum of the performance factors, wherein the performance factors include a numerical value indicative of success within a field of activity of the entity;

a reach score calculator extracting reach factors at least partially from the data feed to derive a reach score based on a weighted sum of the reach factors, wherein the reach factors comprise at least one of:

a total audience of the entity on the virtual networking platform;

an audience growth of the entity on the virtual networking platform over a predetermined period of time;

a total travel coverage of the entity over the predetermined period of time;

a number of interactions of the entity on the virtual networking platform; and a level of activity of interactions between the entity on the virtual networking platform and other entities on the virtual networking platform; and a virtual networking platform sync module having an authentication system, a token management system, an account sync system, and a post sync system, wherein after the at least one account associated with the entity is authenticated, at least one of the commitment score, the performance score, and the reach score are updated using the virtual networking platform sync module, wherein the token management system manages a usage of the tokens to prevent exceeding the rate limit for the API based on past activity of the at least one account of the entity on the virtual networking platform, identified by the account sync system and the post sync system, to determine when to request a data feed update from the API; and at least one display dashboard accessible on the server from a computing device of a 3rd party, the at least one display dashboard visually displaying a marketability assessment of the entity on the virtual networking platform, wherein the marketability assessment is based on a weighted sum of at least one of the commitment score, the performance score, and the reach score, and wherein the display dashboard visually displays the marketability assessment in proximity to at least one ranking of entities selected from the group consisting of: entity performance, brand promotion, and social media performance.

2. The system of claim 1, further comprising a hierarchy calculator configured to calculate a hierarchy level of the entity using the marketability assessment.

3. The system of claim 2, wherein the marketability assessment is derived using a ratio of at least one of the commitment score, the performance score, and the reach score, and wherein the ratio used to generate the marketability assessment is adjusted using the hierarchy level.

4. The system of claim 2, wherein in response to the hierarchy level being within a first range, the marketability assessment is derived using the commitment score, the performance score, and the reach score, and in response to the hierarchy level being within a second range, the marketability assessment is derived using only the performance score and the reach score.

5. The system of claim 4, wherein the hierarchy level within the first range corresponds to a lower marketability assessment than the hierarchy level within the second range.

6. The system of claim 1, wherein the entity is an athlete, and wherein the commitment factors comprise any one or more of a number of years the athlete participated in a sport, a number of years the athlete competed in the sport, a number of days the athlete participated in the sport over a second predetermined period of time, a total number of events the athlete participated in over the second predetermined period of time, and total travel coverage of the athlete over the second predetermined period of time.

7. The system of claim 1, wherein the entity is an athlete, and wherein the performance factors comprise any one or more of top event points obtained over a third predetermined period of time, and statistics of the athlete during at least one competitive event over the third predetermined period of time.

8. The system of claim 1, wherein the reach factors further comprise the performance score.

9. A system for analyzing and quantifying an impact of a presence of an entity within a virtual networking environment to provide a marketability assessment of the entity to a 3rd party, the system comprising:

at least one social media platform having at least one account associated with the entity;

an application programming interface (API) providing a data feed from the at least one account from the at least one social media platform, wherein the data feed is provided in responses to requests, and wherein the API has a rate limit for a number of requests in a period of time, wherein the rate limit is authenticated by tokens;

a server having a processor in communication with the API to receive the data feed from the at least one social media platform and extract a plurality of factors at least partially from the data feed, wherein the plurality of factors are quantified with a plurality of calculators comprising:

an entity score calculator extracting an entity score from factors at least partially from the data feed to derive an impact of the entity using a ratio of a commitment score, a performance score, and a reach score, wherein the commitment score is determined based on at least participation of the entity in a physical activity competition over a period of time, and wherein the reach score is determined from reach factors extracted at least partially from the at least one social media platform, and wherein the reach factors comprise at least one of:

a total audience of the entity on the social media platform;

an audience growth of the entity on the social media platform over a predetermined period of time;

a total travel coverage of the entity over the predetermined period of time;

a number of interactions of the entity on the social media platform; and a level of activity of interactions between the entity on the social media platform and other entities on the social media platform;

a hierarchy calculator extracting hierarchy factors at least partially from the entity score to derive a hierarchy level of the entity, wherein the entity score calculator adjusts the entity score using the hierarchy level calculated by the hierarchy calculator;

a virtual networking platform sync module having an authentication system, a token management system, an account sync system, and a post sync system, wherein after the at least one account associated with the entity is authenticated, at least one of the commitment score, the performance score, and the reach score are updated using the virtual networking platform sync module, wherein the token management system manages a usage of the tokens to prevent exceeding the rate limit for the API based on past activity of the at least one account of the entity on the virtual networking platform, identified by the account sync system and the post sync system, to determine when to request a data feed update from the API; and at least one display dashboard accessible on the server from a computing device of the 3rd party, the at least one display dashboard visually displaying the marketability assessment of the entity on the social media platform, wherein the marketability assessment is based on the entity score, and wherein the display dashboard visually displays the marketability assessment in proximity to at least one ranking of entities selected from the group consisting of: entity performance, brand promotion, and social media performance.

10. The system of claim 9, wherein in response to the hierarchy level being within a first range, the marketability assessment is derived using the commitment score, the performance score, and the reach score, and in response to the hierarchy level being within a second range, the marketability assessment is derived using only the performance score and the reach score.

11. The system of claim 10, wherein the hierarchy level within the first range corresponds to a lower marketability assessment than the hierarchy level within the second range.

12. The system of claim 9, wherein the marketability assessment is derived using a ratio of at least one of the commitment score, the performance score, and the reach score, and wherein the ratio of at least one of the commitment score, the performance score, and the reach score used to generate the marketability assessment is adjusted using the hierarchy level.

13. The system of claim 9, wherein the entity is an athlete, and wherein the commitment factors comprise any one or more of a number of years the athlete participated in a sport, a number of years the athlete competed in the sport, a number of days the athlete participated in the sport over a second predetermined period of time, a total number of events the athlete participated in over the second predetermined period of time, and total travel coverage of the athlete over the second predetermined period of time.

14. The system of claim 9, wherein the entity is an athlete, and wherein the performance factors comprise any one or more of top event points obtained over a third predetermined period of time, and statistics of the athlete during at least one competitive event over the third predetermined period of time.

15. The system of claim 9, wherein the reach factors further comprise the performance score.

16. A system for analyzing and quantifying an impact of a presence of an entity within a virtual networking environment to provide an impact scorecard of the entity to a 3rd party, the system comprising:

at least one virtual networking platform having at least one account associated with the entity;

an application programming interface (API) providing a data feed from the at least one virtual networking platform, wherein the data feed is provided in responses to requests, and wherein the API has a rate limit for a number of requests in a period of time, wherein the rate limit is authenticated by tokens;

a server having a processor in communication with the API to receive the data feed from the at least one virtual networking platform and extract a plurality of factors at least partially from the data feed, wherein the plurality of factors are quantified with a plurality of calculators comprising:

a commitment score calculator extracting commitment factors at least partially from the data feed to derive a commitment score based on a weighted sum of the commitment factors, wherein the commitment factors include a time period of activity of the entity on the at least one virtual networking platform;

a performance score calculator extracting performance factors at least partially from the data feed to derive a performance score based on a weighted sum of the performance factors, wherein the performance factors include a numerical value indicative of success within a field of activity of the entity;

a reach score calculator extracting reach factors at least partially from the data feed to derive a reach score based on a weighted sum of the reach factors;

a virtual networking platform sync module having an authentication system, a token management system, an account sync system, and a post sync system, wherein after the at least one account associated with the entity is authenticated, at least one of the commitment score, the performance score, and the reach score are updated using the virtual networking platform sync module, wherein the token management system manages a usage of the tokens to prevent exceeding the rate limit for the API based on past activity of the at least one account of the entity on the virtual networking platform, identified by the account sync system and the post sync system, to determine when to request a data feed update from the API; and at least one display dashboard accessible on the server from a computing device of the 3rd party, the at least one display dashboard visually displaying a total impact score for the entity on the virtual networking platform based on at least one updated commitment score, updated performance score, and updated reach score, wherein the display dashboard visually displays a marketability assessment.

17. The system of claim 16, further comprising a hierarchy calculator configured to calculate a hierarchy level of the entity using the marketability assessment, wherein the total impact score is displayed as a numeric value, wherein the at least one updated commitment score, updated performance score, and updated reach score are displayed as visual graphs, and wherein the hierarchy level is displayed as at least one of: a second numeric value and a visual graph.

18. The system of claim 17, wherein in response to the hierarchy level being within a first range, the total impact score is derived using the commitment score, the performance score, and the reach score, and in response to the hierarchy level being within a second range, the total impact score is derived using only the performance score and the reach score.

19. The system of claim 18, wherein the hierarchy level within the first range corresponds to a lower total impact score than the hierarchy level within the second range.

20. The system of claim 17, wherein the total impact score is derived using a ratio of at least one of the commitment score, the performance score, and the reach score, and wherein the ratio used to generate an athlete score is adjusted using the hierarchy level calculated by the hierarchy calculator.

* * * * *